(12) United States Patent
Matsubayashi

(10) Patent No.: US 6,459,419 B1
(45) Date of Patent: Oct. 1, 2002

(54) IMAGE PROCESSING APPARATUS AND METHOD

(75) Inventor: Kazuhiro Matsubayashi, Yokohama (JP)

(73) Assignee: Canon Kabushiki Kaisha, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/943,118

(22) Filed: Oct. 3, 1997

(30) Foreign Application Priority Data

Oct. 4, 1996 (JP) .............................. 8-264369
Sep. 4, 1997 (JP) .............................. 9-239959

(51) Int. Cl.$^7$ ................................. G09G 5/00
(52) U.S. Cl. ...................................... 345/156
(58) Field of Search .................. 345/150, 153, 345/199, 431, 591, 593, 597, 600, 601, 604; 358/523, 1.9; 382/274, 270; 348/645, 649, 655

(56) References Cited

U.S. PATENT DOCUMENTS

| | | | | |
|---|---|---|---|---|
| 4,796,086 A | * | 1/1989 | Ohta et al. .................... 358/80 |
| 4,989,079 A | * | 1/1991 | Ito .............................. 358/80 |
| 5,136,401 A | * | 8/1992 | Yamamoto et al. ......... 358/474 |
| 5,187,570 A | * | 2/1993 | Hibi et al. .................... 358/80 |
| 5,416,890 A | * | 5/1995 | Beretta ........................ 395/131 |
| 5,515,172 A | * | 5/1996 | Shiau .......................... 358/298 |
| 5,537,228 A | * | 7/1996 | Dillinger .................... 358/502 |
| 5,689,590 A | * | 11/1997 | Shirasawa et al. .......... 382/254 |
| 5,768,403 A | * | 6/1998 | Suzuki et al. ............... 382/165 |
| 5,847,692 A | * | 12/1998 | Ono ........................... 345/153 |
| 5,867,169 A | * | 2/1999 | Prater ......................... 345/431 |

* cited by examiner

*Primary Examiner*—Kent Chang
(74) *Attorney, Agent, or Firm*—Fitzpatrick, Cella, Harper & Scinto

(57) ABSTRACT

The saturation, the lightness, and the hue of each color used in input image data are calculated by a saturation calculation unit, a lightness calculation unit, and a hue calculation unit, respectively. An achromatic color/chromatic color classification unit classifies the color as an achromatic color or a chromatic color on the basis of the calculated saturation. An achromatic color/lightness order assignment unit assigns, on the basis of the lightness of the color classified as an achromatic color, an achromatic color which can be displayed on an LCD to the color classified as an achromatic color. A chromatic color/hue order assignment unit assigns, on the basis of the hue of the color classified as a chromatic color, a chromatic color which can be displayed on the LCD to the color classified as a chromatic color.

21 Claims, 31 Drawing Sheets

FIG.6

| IMAGE USE COLOR | | | | | | | CONVERSION RESULT |
|---|---|---|---|---|---|---|---|
| NAME OF COLOR | R | G | B | S | L | H | NAME OF COLOR |
| WHITE | 255 | 255 | 255 | 0 | 255 | 0 | WHITE |
| GRAY | 105 | 105 | 105 | 0 | 105 | 00 | DARK GRAY |
| BLACK | 0 | 0 | 0 | 0 | 0 | 0 | BLACK |
| RED | 255 | 3 | 13 | 252 | 129 | 358 | LIGHT RED |
| ORANGE | 235 | 97 | 3 | 232 | 119 | 24 | DARK YELLOW |
| YELLOW | 255 | 153 | 18 | 237 | 136 | 34 | LIGHT GREEN |
| GREEN | 48 | 127 | 20 | 107 | 73 | 105 | DARK GREEN |
| BLUE GREEN | 64 | 224 | 208 | 160 | 144 | 174 | DARK CYAN |
| BLUE | 0 | 0 | 205 | 205 | 102 | 240 | LIGHT BLUE |
| PURPLE | 160 | 0 | 192 | 192 | 96 | 290 | DARK MAGENTA |
| RED PURPLE | 199 | 21 | 133 | 178 | 110 | 323 | LIGHT MAGENTA |
| FLESH | 244 | 164 | 96 | 148 | 170 | 27 | LIGHT YELLOW |
| BROWN | 135 | 66 | 31 | 104 | 83 | 20 | DARK RED |
| AQUA BLUE | 135 | 206 | 235 | 100 | 185 | 198 | LIGHT CYAN |
| NAVY BLUE | 18 | 10 | 143 | 133 | 76 | 243 | DARK BLUE |
| PINK | 255 | 192 | 203 | 63 | 223 | 350 | LIGHT GRAY |

FIG.19

| | IMAGE USE COLOR | | | | | | CONVERSION RESULT |
|---|---|---|---|---|---|---|---|
| | NAME OF COLOR | R | G | B | S | L | H | NAME OF COLOR |
| FIRST IMAGE | WHITE | 255 | 255 | 255 | 0 | 255 | 0 | WHITE |
| | GRAY | 105 | 105 | 105 | 0 | 105 | 0 | DARK GRAY |
| | BLACK | 0 | 0 | 0 | 0 | 0 | 0 | BLACK |
| | RED | 255 | 3 | 13 | 252 | 129 | 358 | LIGHT RED |
| | ORANGE | 235 | 97 | 3 | 232 | 119 | 24 | DARK RED |
| | YELLOW | 255 | 153 | 18 | 237 | 136 | 34 | DARK YELLOW |
| | GREEN | 48 | 127 | 20 | 107 | 73 | 105 | DARK GREEN |
| | BLUE GREEN | 64 | 224 | 208 | 160 | 144 | 174 | LIGHT CYAN |
| | BLUE | 0 | 0 | 205 | 205 | 102 | 240 | DARK BLUE |
| | PURPLE | 160 | 0 | 192 | 192 | 96 | 290 | DARK MAGENTA |
| | RED PURPLE | 199 | 21 | 133 | 178 | 110 | 323 | LIGHT MAGENTA |
| | FLESH | 244 | 164 | 96 | 148 | 170 | 27 | LIGHT YELLOW |
| SECOND IMAGE | WHITE | 255 | 255 | 255 | 0 | 255 | 0 | WHITE |
| | GRAY | 105 | 105 | 105 | 0 | 105 | 0 | DARK GRAY |
| | BLACK | 0 | 0 | 0 | 0 | 0 | 0 | BLACK |
| | RED | 255 | 3 | 13 | 252 | 129 | 358 | LIGHT RED |
| | ORANGE | 235 | 97 | 3 | 232 | 119 | 24 | DARK YELLOW |
| | YELLOW | 255 | 153 | 18 | 237 | 136 | 34 | LIGHT YELLOW |
| | BROWN | 135 | 66 | 31 | 104 | 83 | 20 | DARK RED |
| | AQUA BLUE | 135 | 206 | 235 | 100 | 185 | 198 | LIGHT CYAN |
| | NAVY BLUE | 18 | 10 | 143 | 133 | 76 | 243 | DARK BLUE |
| | PINK | 255 | 192 | 203 | 63 | 223 | 350 | LIGHT MAGENTA |

FIG.20

| | IMAGE USE COLOR | | | | | | | CONVERSION RESULT |
|---|---|---|---|---|---|---|---|---|
| | NAME OF COLOR | R | G | B | S | L | H | NAME OF COLOR |
| FIRST IMAGE | WHITE | 255 | 255 | 255 | 0 | 255 | 0 | WHITE |
| | GRAY | 105 | 105 | 105 | 0 | 105 | 0 | DARK GRAY |
| | BLACK | 0 | 0 | 0 | 0 | 0 | 0 | BLACK |
| | RED | 255 | 3 | 13 | 252 | 129 | 358 | LIGHT RED |
| | ORANGE | 235 | 97 | 3 | 232 | 119 | 24 | DARK YELLOW |
| | YELLOW | 255 | 153 | 18 | 237 | 136 | 34 | LIGHT GREEN |
| | GREEN | 48 | 127 | 20 | 107 | 73 | 105 | DARK GREEN |
| | BLUE GREEN | 64 | 224 | 208 | 160 | 144 | 174 | DARK CYAN |
| | BLUE | 0 | 0 | 205 | 205 | 102 | 240 | LIGHT BLUE |
| | PURPLE | 160 | 0 | 192 | 192 | 96 | 290 | DARK MAGENTA |
| | RED PURPLE | 199 | 21 | 133 | 178 | 110 | 323 | LIGHT MAGENTA |
| | FLESH | 244 | 164 | 96 | 148 | 170 | 27 | LIGHT YELLOW |
| SECOND IMAGE | WHITE | 255 | 255 | 255 | 0 | 255 | 0 | WHITE |
| | GRAY | 105 | 105 | 105 | 0 | 105 | 0 | DARK GRAY |
| | BLACK | 0 | 0 | 0 | 0 | 0 | 0 | BLACK |
| | RED | 255 | 3 | 13 | 252 | 129 | 358 | LIGHT RED |
| | ORANGE | 235 | 97 | 3 | 232 | 119 | 24 | DARK YELLOW |
| | YELLOW | 255 | 153 | 18 | 237 | 136 | 34 | LIGHT GREEN |
| | BROWN | 135 | 66 | 31 | 104 | 83 | 20 | DARK RED |
| | AQUA BLUE | 135 | 206 | 235 | 100 | 185 | 198 | LIGHT CYAN |
| | NAVY BLUE | 18 | 10 | 143 | 133 | 76 | 243 | DARK BLUE |
| | PINK | 255 | 192 | 203 | 63 | 223 | 350 | LIGHT GRAY |

FIG.22
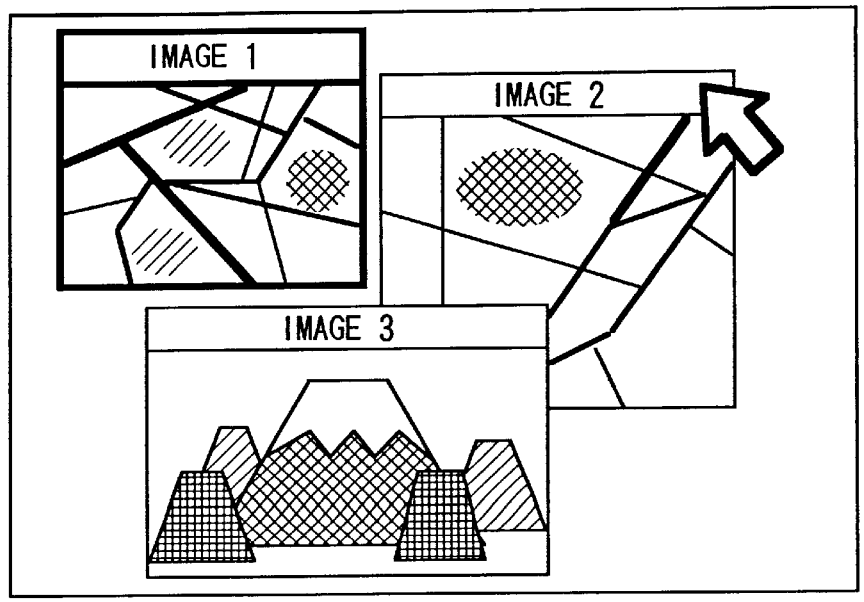
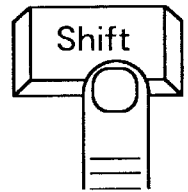
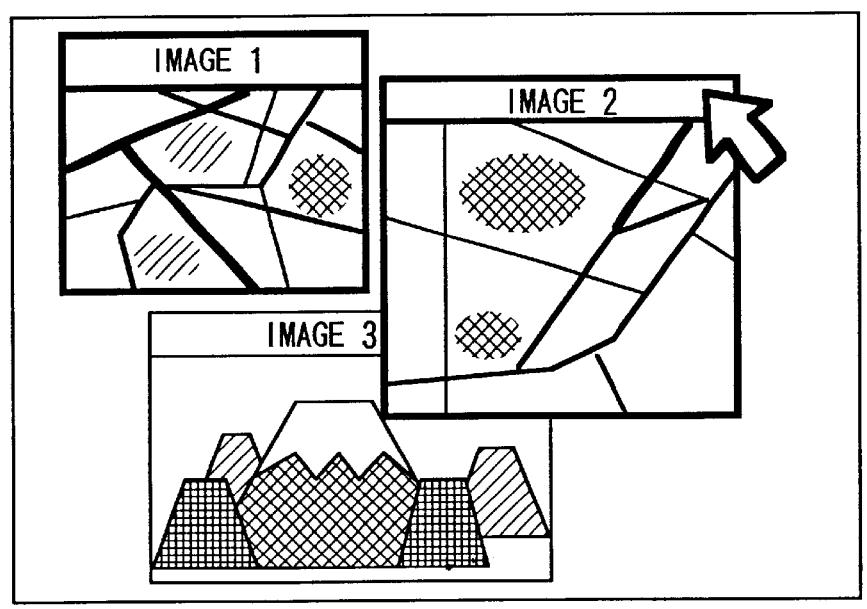
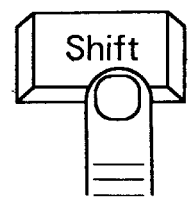

FIG.23
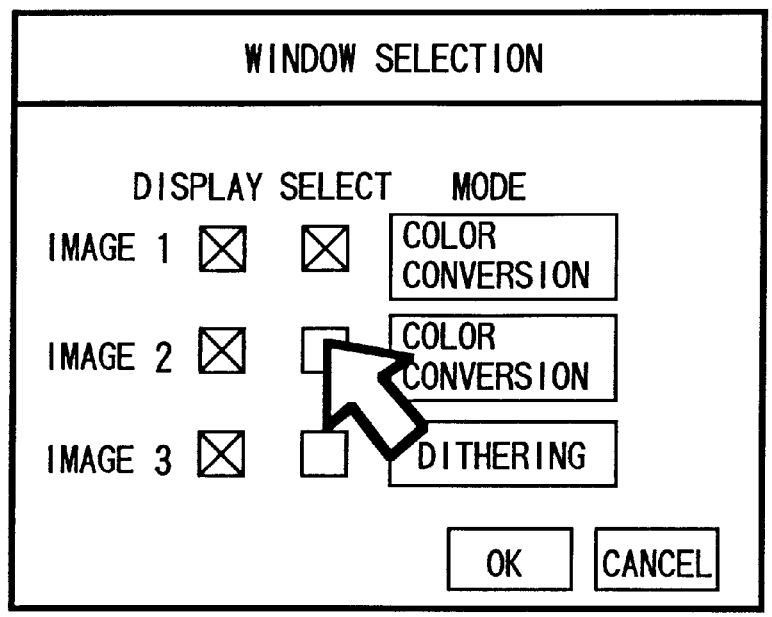
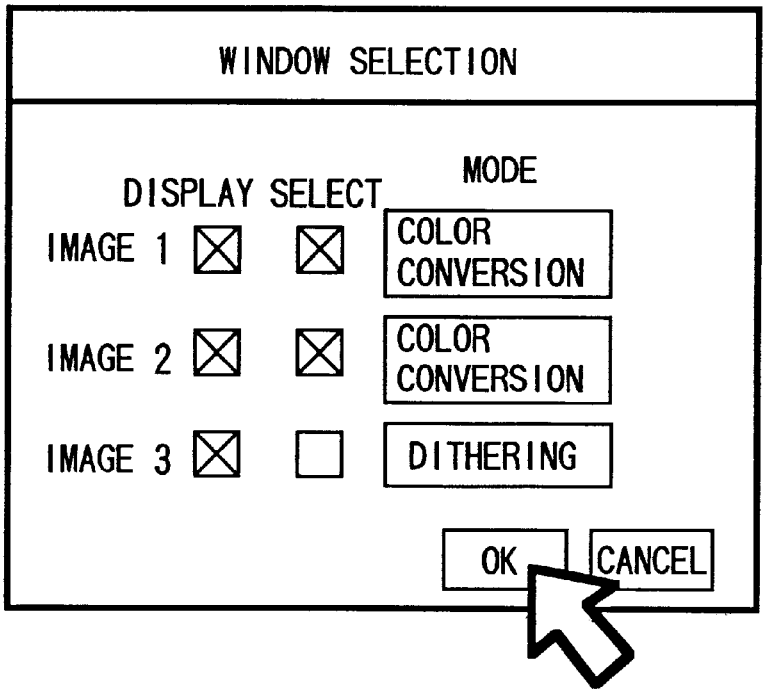

FIG.26

COLOR CONVERSION SETTING

KEYWORD

| | COLOR CONVERSION RESULT | | |
|---|---|---|---|
| | R | G | B |
| NATIONAL ROAD → | 255 | 255 | 85 |
| CONTOUR → | 255 | 85 | 85 |

[ADD] [DELETE] [OK] [CANCEL]

FIG.29

| VALUE OF SUBPIXEL | | | | R, G, AND B VALUES OF IMAGE | | | COLOR OF PIXEL |
|---|---|---|---|---|---|---|---|
| RED | GREEN | BLUE | WHITE | R | G | B | |
| 0 | 0 | 0 | 0 | 0 | 0 | 0 | BLACK |
| 0 | 0 | 0 | 1 | 85 | 85 | 85 | DARK GRAY |
| 0 | 0 | 1 | 0 | 0 | 0 | 170 | DARK BLUE |
| 0 | 0 | 1 | 1 | 85 | 85 | 255 | LIGHT BLUE |
| 0 | 1 | 0 | 0 | 0 | 170 | 0 | DARK GREEN |
| 0 | 1 | 0 | 1 | 85 | 255 | 85 | LIGHT GREEN |
| 0 | 1 | 1 | 0 | 0 | 170 | 170 | DARK CYAN |
| 0 | 1 | 1 | 1 | 85 | 255 | 255 | LIGHT CYAN |
| 1 | 0 | 0 | 0 | 170 | 0 | 0 | DARK RED |
| 1 | 0 | 0 | 1 | 255 | 85 | 85 | LIGHT RED |
| 1 | 0 | 1 | 0 | 170 | 0 | 170 | DARK MAGENTA |
| 1 | 0 | 1 | 1 | 255 | 85 | 255 | LIGHT MAGENTA |
| 1 | 1 | 0 | 0 | 170 | 170 | 0 | DARK YELLOW |
| 1 | 1 | 0 | 1 | 255 | 255 | 85 | LIGHT YELLOW |
| 1 | 1 | 1 | 0 | 170 | 170 | 170 | LIGHT GRAY |
| 1 | 1 | 1 | 1 | 255 | 255 | 255 | WHITE |

FIG.31

| IMAGE USE COLOR | | | | CONVERSION RESULT |
|---|---|---|---|---|
| NAME OF COLOR | R | G | B | NAME OF COLOR |
| WHITE | 255 | 255 | 255 | WHITE |
| GRAY | 105 | 105 | 105 | DARK GRAY |
| BLACK | 0 | 0 | 0 | BLACK |
| RED | 255 | 3 | 13 | DARK RED |
| ORANGE | 235 | 97 | 3 | LIGHT RED |
| YELLOW | 255 | 153 | 18 | DARK YELLOW |
| GREEN | 48 | 127 | 20 | BLACK |
| BLUE GREEN | 64 | 224 | 208 | LIGHT CYAN |
| BLUE | 0 | 0 | 205 | DARK BLUE |
| PURPLE | 160 | 0 | 192 | DARK MAGENTA |
| RED PURPLE | 199 | 21 | 133 | DARK MAGENTA |
| FLESH | 244 | 164 | 96 | LIGHT YELLOW |
| BROWN | 135 | 66 | 31 | DARK RED |
| AQUA BLUE | 135 | 206 | 235 | WHITE |
| NAVY BLUE | 18 | 10 | 143 | DARK BLUE |
| PINK | 255 | 192 | 203 | WHITE |

IMAGE PROCESSING APPARATUS AND METHOD

BACKGROUND OF THE INVENTION

The present invention relates to an image processing apparatus and method for assigning colors used in input image data to colors which can be output from an output device.

FIG. 28 shows an example of the pixel arrangement of a conventional 16-color display. As shown in FIG. 28, one pixel is constituted by four subpixels of red, green, blue, and white. Each subpixel takes a value of 1 (ON) or 0 (OFF). By combining these subpixels, 16 colors as shown in FIG. 29 can be expressed.

When it is assumed that, in general color image data, each of R, G, and B components per pixel can take 256 values, 16,777,216 colors can be expressed. When this color image data is to be displayed on the above 16-color display, the colors must be converted into colors expressible on the 16-color display because the colors used in the image data cannot be directly expressed.

In a conventional image processing apparatus for realizing the above-described color conversion, the following color conversion techniques are used depending on application purposes.

For color image data consisting of text data using a small number of colors, simple quantization processing is performed to convert the colors used in the image data into colors expressible on the 16-color display. More specifically, colors used in the image data are converted into colors expressible on the 16-color display on the basis of upper bits of R, G, and B values. As a specific example, color conversion using this technique for the 16-color display shown in FIG. 28 will be described with reference to FIG. 30. Assume that each of R, G, and B values as color components of color image data is represented by 8 bits. As shown in FIG. 30, the uppermost bits of the R, G, and B values are made to correspond to red, green, and blue subpixels constituting one pixel of the 16-color display, respectively. Additionally, the majority of second upper bits of the R, G, and B values is made to correspond to the white subpixel. This processing is executed for each pixel, thereby converting colors used in the image data into colors expressible on the 16-color display.

Color image data of, e.g., a halftone image such as a photograph using a relatively large number of colors is subjected to pseudo halftone processing known as dithering or error diffusion in units of R, G, and B values to abundantly express the halftone. With this processing, colors used in the color image data are converted into colors expressible on the 16-color display.

In the conventional image processing apparatus, however, when color conversion is performed for color image data of a map, a graph, or a CAD having pieces of graphic or character information distinguished using a plurality of colors, the following problems are posed.

When colors used in color image data are converted into colors expressible on the 16-color display on the basis of upper bits of R, G, and B values, i.e., the color components of the color image data, lower bits are omitted, and another color may be assigned to a given color. For this reason, pieces of information distinguished using a plurality of colors cannot be properly distinguished.

FIG. 31 is a view showing the relationship between colors used in color image data and conversion results obtained upon performing color conversion described in FIG. 30. As shown in FIG. 31, colors used in the color image data before color conversion are classified into 16 colors. After color conversion, white, black, dark red, dark blue, and dark magenta are overlappingly assigned to the 16 colors. When color image data obtained by this color conversion is displayed on the 16-color display, only 10 colors are expressed.

When pseudo halftone processing is performed to convert colors used in color image data into those expressible on the 16-color display, a unique dot pattern is generated upon color conversion. When color image data obtained by this color conversion is displayed on the 16-color display, especially pieces of graphic or character information which are distinguished using a plurality of colors can hardly be distinguished.

SUMMARY OF THE INVENTION

The present invention has been made in consideration of the above problems, and has as its object to provide an image processing apparatus and method which allow to clearly output lines or characters in input image data when colors used in the input image data are assigned to colors which can be output from an output device, and also allow to output properly distinguishable colors.

In order to achieve the above object, according to the present invention, there is provided an image processing apparatus for assigning colors used in input image data to colors which can be output from an output device, comprising:

classification means for classifying the colors used in the input image data as achromatic colors or chromatic colors on the basis of saturations of the colors used in the input image data;

first assignment means for assigning, on the basis of lightnesses of the colors classified as the achromatic colors by the classification means, achromatic colors which can be output from the output device to the colors classified as the achromatic colors; and second assignment means for assigning, on the basis of hues of the colors classified as the chromatic colors by the classification means, chromatic colors which can be output from the output device to the colors classified as the chromatic colors.

In order to achieve the above object, according to the present invention, there is also provided an image processing method of assigning colors used in input image data to colors which can be output from an output device, comprising:

the classification step of classifying the colors used in the input image data as achromatic colors or chromatic colors on the basis of saturations of the colors used in the input image data;

the first assignment step of assigning, on the basis of lightnesses of the colors classified as the achromatic colors in the classification step, achromatic colors which can be output from the output device to the colors classified as the achromatic colors; and the second assignment step of assigning, on the basis of hues of the colors classified as the chromatic colors in the classification step, chromatic colors which can be output from the output device to the colors classified as the chromatic colors.

In order to achieve the above object, according to the present invention, there is also provided a computer-readable memory which stores program codes of image processing, comprising:

a program code of the classification step of classifying colors used in input image data as achromatic colors or chromatic colors on the basis of saturations of the colors used in the input image data;

a program code of the first assignment step of assigning, on the basis of lightnesses of the colors classified as the achromatic colors in the classification step, achromatic colors which can be output from an output device to the colors classified as the achromatic colors; and a program code of the second assignment step of assigning, on the basis of hues of the colors classified as the chromatic colors in the classification step, chromatic colors which can be output from the output device to the colors classified as the chromatic colors.

According to the present invention having the above arrangement, an image processing apparatus and method which allow to clearly output lines or characters in input image data when colors used in the input image data are assigned to colors which can be output from an output device, and also allow to output properly distinguishable colors can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 6 is a view showing results obtained by color conversion by the color conversion unit 45 of the first embodiment;

FIG. 19 is a view showing results obtained by independently performing color conversion using a color conversion unit 45 of the fourth embodiment for a plurality of images;

FIG. 20 is a view showing results obtained by performing color conversion using the color conversion unit 45 of the fourth embodiment such that commonly used colors are converted into the same color;

FIG. 22 is a view showing an operation of, in the fourth embodiment, clicking a mouse 12 or a pen 13 while keeping the shift key of a keyboard 11 depressed, thereby selecting a new window without canceling a window which is being selected;

FIG. 23 is a view showing an operation of, in the fourth embodiment, displaying a list representing the states of generated windows and checkmarking the columns of windows to be selected;

FIG. 26 is a view showing the color conversion setting window for setting, as conversion results, R, G, and B values stored in advance in correspondence with keywords using the image display application 31 in the fifth embodiment;

FIG. 29 is a view showing the relationship among colors which can be displayed on the conventional 16-color display, R, G, and B values, and subpixels;

FIG. 31 is a view showing results obtained by the conventional color conversion.

DESCRIPTION OF THE PREFERRED EMBODIMENTS

The preferred embodiments of the present invention will be described below in detail with reference to the accompanying drawings.

First Embodiment

Figure 1:
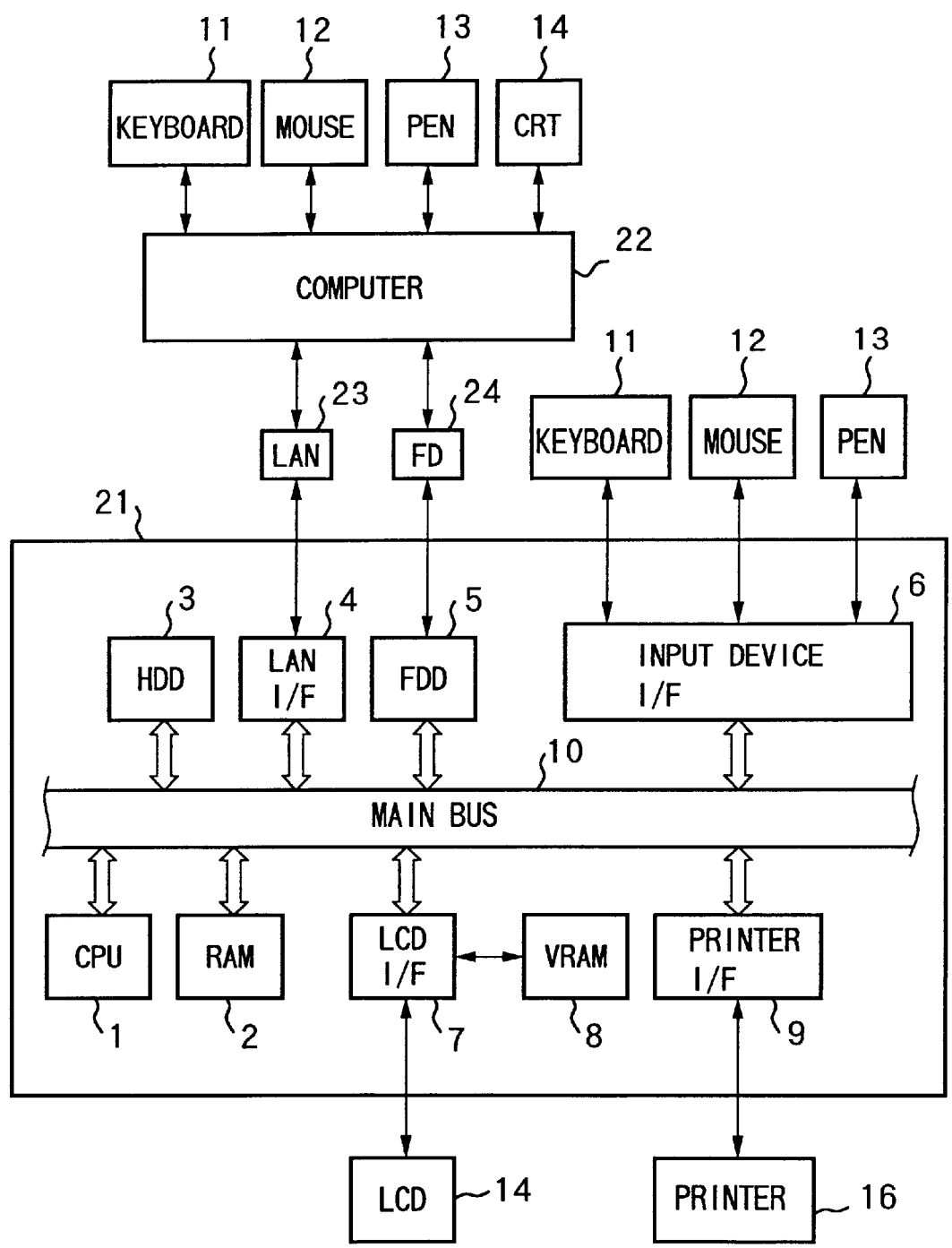
FIG. 1 is a block diagram showing the configuration of a computer system for realizing a color conversion system according to the present invention.

FIG. 1 is a block diagram showing the configuration of a computer system for realizing a color conversion system according to the present invention.

In an image display computer 21, a CPU 1 executes control for the entire image display computer 21 via a main bus 10. The CPU 1 also executes a series of processing operations including image input, image processing, color conversion processing, and image output control in accordance with instructions input from an input device. Image data and other information to be displayed on the screen are stored in a VRAM 8 and displayed on an LCD 14 through an LCD I/F 7. The image data and other information are also output to a printer 16 through a printer I/F 9.

In a RAM 2, an OS or control programs including ones for realizing the present invention are loaded and executed by the CPU 1. The RAM 2 also functions as a work area or a temporary save area for various data used to execute the control programs.

An HDD 3 is a storage unit for storing a larger quantity of programs or data. Programs or data in the HDD 3 are not deleted even in a power-OFF state. A LAN I/F 4 is an interface for transmitting/receiving data to/from an image generation computer 22 or other peripheral devices through a LAN 23. An interface for transmitting/receiving data to/from the image generation computer 22 or other peripheral devices through a telephone line or the like may also be arranged.

An FDD (Floppy Disk Drive) 5 functions to transmit/receive data to/from the image generation computer 22 through an FD (Floppy Disk) 24. A storage unit for transmitting/receiving data to/from the image generation computer 22 through a detachably attached storage medium such as a disk of another type such as a CD-ROM, an MO, or a DVD, or a tape may also be arranged.

The image generation computer 22 has the same constituent elements as those of the image display computer 21. However, a CRT 15 serving as the display unit of the image generation computer 22 does not always have the same expression capability as that of the LCD 14 of the image display computer 21. More specifically, the number of vertical or horizontal pixels in the screen or the number of expressible colors may differ from that of the LCD 14.

The functional arrangement of a color conversion system of the first embodiment will be described next with reference to FIG. 2.

Figure 2:
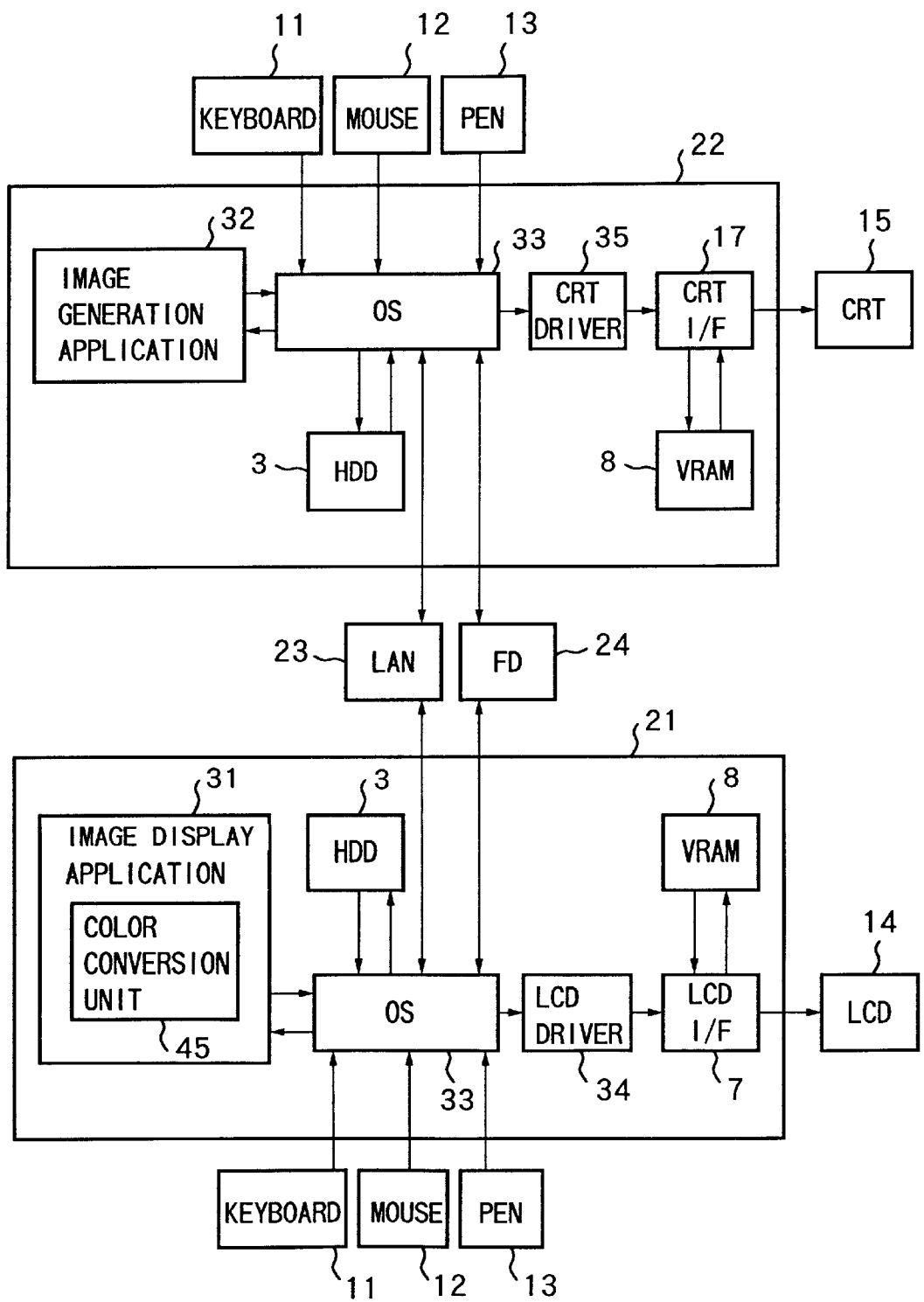
FIG. 2 is a block diagram showing the functional arrangement of a color conversion system according to the first embodiment.

FIG. 2 is a block diagram showing the functional arrangement of the color conversion system of the first embodiment.

In the color conversion system to be described in the first embodiment, image data generated on the image generation computer 22 is displayed on the LCD 14 connected to the image display computer 21 through the LAN 23 or the FD 24.

In the image generation computer 22 and the image display computer 21, reference numerals 31, 32, 33, 34, and 35 denote programs executed by the CPU 1.

The OS (Operating System) 33 manages the operations of devices and applications. The image generation application 32 generates user-desired image data upon user input from a keyboard 11, a mouse 12, or a pen 13. The image generation application 32 executes the drawing command of the OS 33, thereby displaying the generated image data on the screen. The OS 33 interprets the application or the drawing command of the OS itself to determine the layout on the screen.

The CRT driver 35 writes, on the VRAM 8, the screen data having a layout determined by the OS 33 in accordance with a drawing command unique to a CRT I/F 17. The CRT I/F 17 loads screen data in the VRAM 8 every time the screen is scanned, thereby displaying the data on the CRT 15. The image generation application 32 stores the generated image data in the HDD 3 or the FD 24 as a file in accordance with file management of the OS 33 and transfers the image data to the other computer through the LAN 23.

The image display application 31 executes the drawing command of the OS 33 to load image data stored in the HDD 3 or the FD 24 or image data transferred from the LAN 23 and display the image data on the screen. The OS 33 interprets the application or the drawing command of the OS itself to determine the layout on the screen. The LCD driver 34 writes, on the VRAM 8, the screen data having the layout determined by the OS 33 in accordance with the drawing command unique to the LCD I/F 7. The LCD I/F 7 loads screen data in the VRAM 8 every time the screen is scanned, thereby displaying the data on the LCD 14.

In the first embodiment, image data generated by the image generation application 32 is assumed to be image data of a map, a graph, or a CAD having pieces of graphic or character information distinguished using a plurality of colors. In many cases, these image data can be classified by 16 or less colors because the number of colors used is relatively small. The LCD 14 has the arrangement shown in FIG. 28 and accordingly can express only 16 colors, as shown in FIG. 29, although 16 colors are enough to display such image data.

Figure 30:
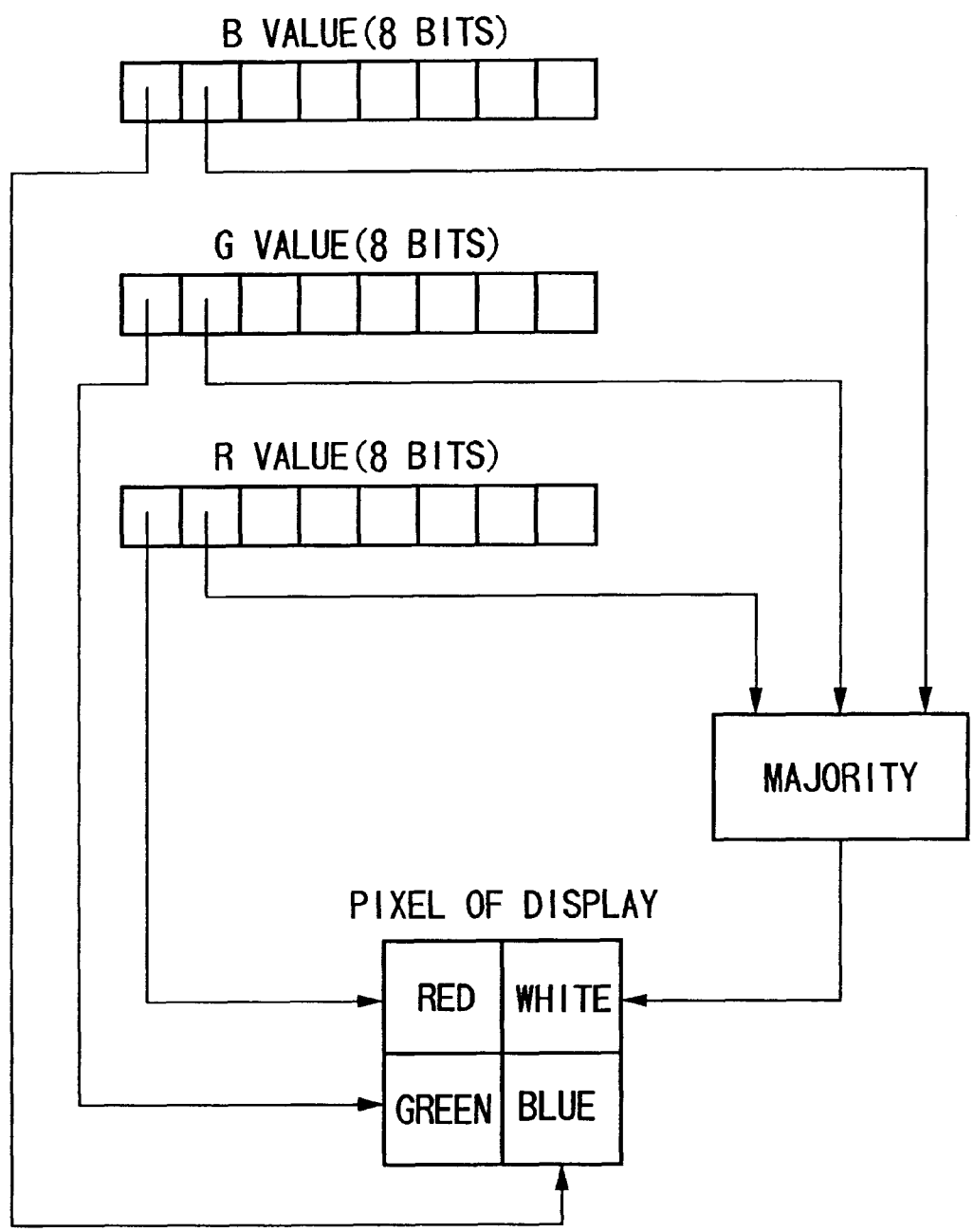
FIG. 30 is a view for explaining an example of conventional color conversion.

When the image generation computer 22 and the image display computer 21 are independently arranged, as shown in FIG. 2, whether colors in image data generated by the image display computer 21 can be expressed on the image display computer 21 is not taken into consideration at all. In some cases, colors in image data generated by the image generation computer 22 cannot be expressed on the image display computer 21. When colors of a drawing instructed with the drawing command of the OS 33 cannot be expressed on the LCD 14, the LCD driver 34 converts the colors into colors expressible on the LCD 14 and displays the image data, as shown in FIG. 30. In this case, however, the colors cannot be properly discriminated, as described in the problems of prior art. In the first embodiment, a color conversion unit 45 for making colors in image data generated by the image generation computer 22 to correspond to colors expressible on the image display computer 21 is arranged to solve the above problem.

The functional arrangement of the image display application 31 will be described next with reference to FIG. 3.

Figure 3:
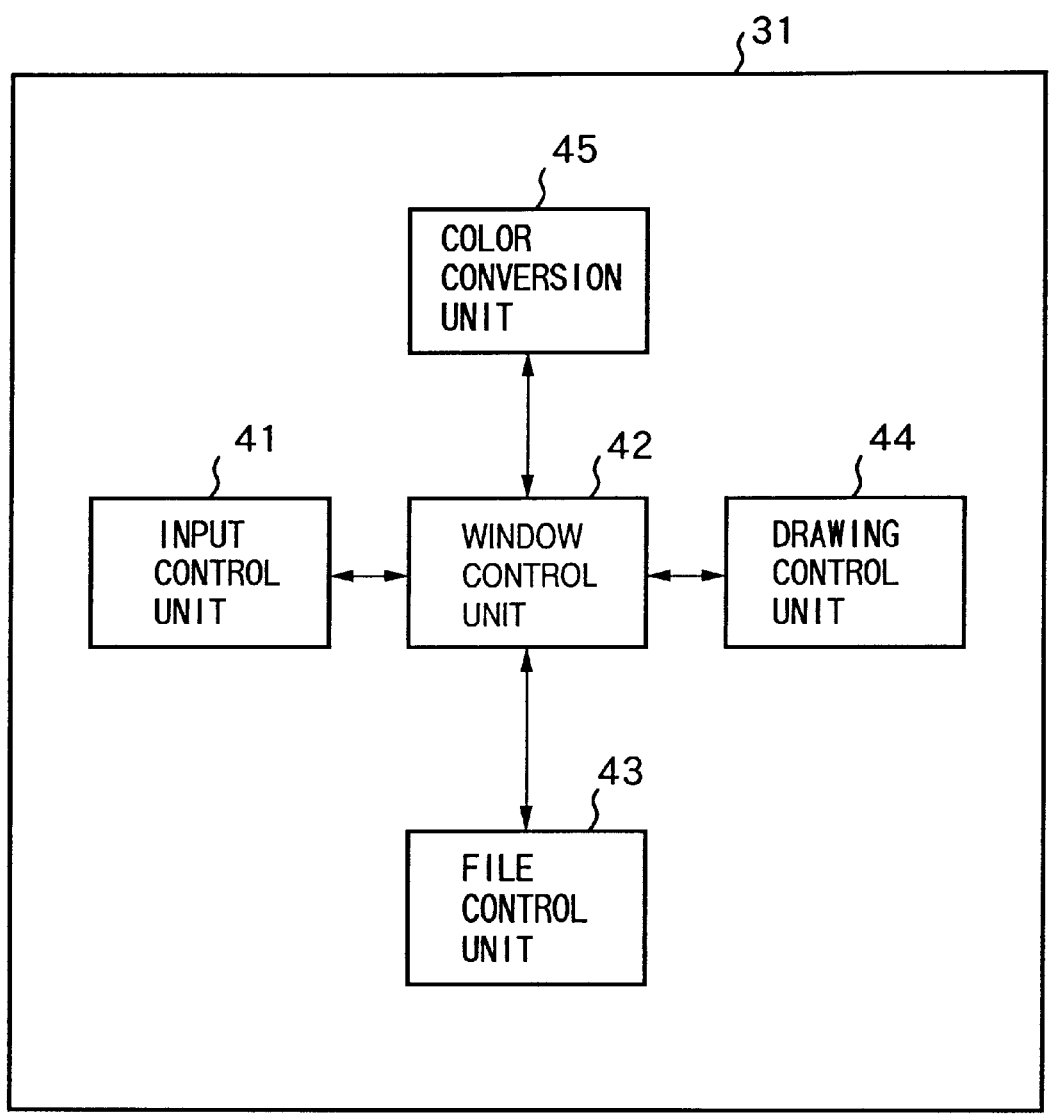
FIG. 3 is a block diagram showing the functional arrangement of an image display application 31 of the first embodiment.

FIG. 3 is a block diagram showing the functional arrangement of the image display application of the first embodiment.

Image data is displayed as a window on the screen. When the OS 33 corresponds to a multi-window mode, a plurality of windows can be simultaneously displayed.

Upon receiving an input from the keyboard 11, the mouse 12, or the pen 13 for a button on a window or image data, the OS 33 notifies the image display application 31 of an event based on the input. An input control unit 41 of the image display application 31 receives the event and determines processing.

A window control unit 42 determines display of a new image or rewriting of image data, as needed, on the basis of processing determined by the input control unit 41, e.g., load, storage, range selection, or color conversion of image data. The window control unit 42 also determines read or storage of a file, as needed. When the OS 33 executes generation, deletion, display/nondisplay, selection, cancel of selection, movement, or enlargement/reduction of a window, the window control unit 42 determines display of a new image or rewriting of image data, as needed.

A file control unit 43 loads image data of a window from a file or stores image data of a window in a file in accordance with determination of the window control unit 42. A drawing control unit 44 analyzes image data loaded from a file in accordance with determination of the window control unit 42 and issues a drawing command to the OS 33.

The color conversion unit 45 performs color conversion processing as the characteristic feature of the present invention in accordance with determination of the window control unit 42. Two timings are available for color conversion processing.

First, color conversion processing of the present invention is started for an image which has already been subjected to conventional color conversion processing such as simple quantization processing or pseudo halftone processing and displayed, thereby immediately displaying an image after color conversion processing of the present invention.

Second, one of processing modes including the simple quantization processing mode, the error diffusion mode, and the color conversion mode of the present invention is selected in advance. When a window is to be generated later to display a new image, color conversion processing according to the selected processing mode is performed. Alternatively, attribute information representing processing modes for display are stored in correspondence with image files. When an image file is to be opened to display the image, the attribute information may be referred to, thereby determining the color conversion processing technique.

A detailed arrangement of the color conversion unit 45 will be described next with reference to FIG. 4.

Figure 4:
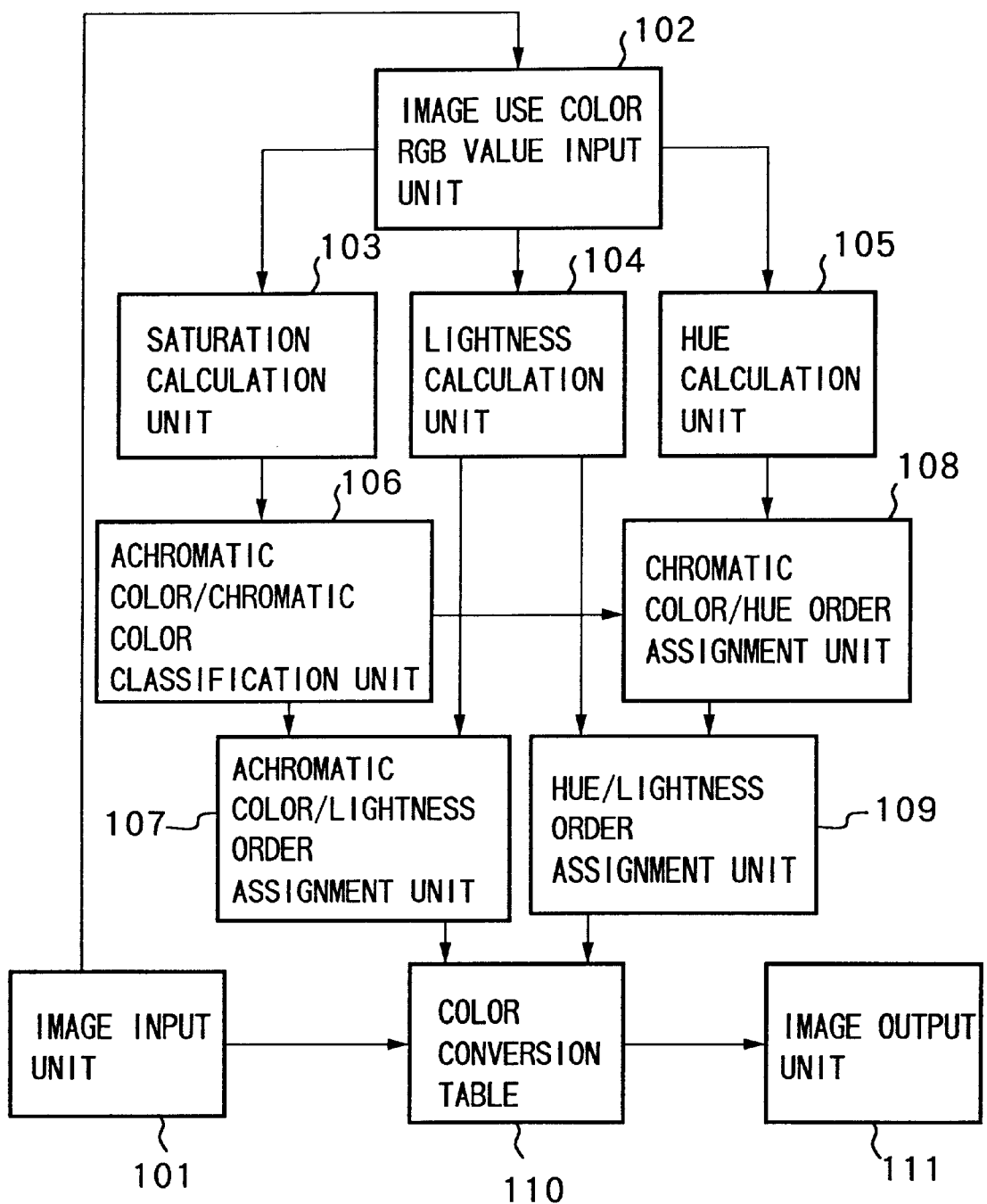
FIG. 4 is a block diagram showing a detailed arrangement of a color conversion unit 45 of the first embodiment.

FIG. 4 is a block diagram showing a detailed arrangement of the color conversion unit 45 of the first embodiment.

Reference numeral 101 denotes an image input unit for receiving image data of a designated window. This image data is generated by the image generation computer 22 and transferred through the LAN 23 or the FD 24. In this image data, each of R, G, and B components of one pixel can take 256 values, so that 16,777,216 colors can be expressed. Since image data to be handled in the first embodiment is image data of a map, a graph, or a CAD including pieces of graphic or character information distinguished using a relatively small number of colors, arbitrary 16 or less colors of the 16,777,216 colors are used. For the descriptive convenience, the number of colors used in the image data is assumed to be 16.

Reference numeral 102 denotes an image use color RGB value input unit for inputting R, G, and B values of colors used in the image data input to the image input unit 101. When the R, G, and B values directly represent pixel values, the pixel values are sequentially loaded. When new R, G, and B values appear, the R, G, and B values are stored. If the R, G, and B values are stored in a color palette, the R, G, and B values are loaded from the color palette. In any cases, R, G, and B values of all colors used in the image data are stored.

Reference numerals 103, 104, and 105 respectively denote a saturation calculation unit, a lightness calculation unit, and a hue calculation unit which calculate a saturation S, a lightness L, and a hue H of the image data, respectively, using the R, G, and B values stored by the image use color RGB value input unit 102. Examples of equations for the saturation S, the lightness L, and the hue H calculated by the saturation calculation unit 103, the lightness calculation unit 104, and the hue calculation unit 105, respectively, will be shown below.

When $R \geq G \geq B$, $$S=R-B,\ L=(R+B)/2,\ H=60\times(G-B)/(R-B)$$

When $G \geq R \geq B$, $$S=G-B,\ L=(G+B)/2,\ H=120-60\times(R-B)/(G-B)$$

When $G \geq B \geq R$, $$S=G-R,\ L=(G+R)/2,\ H=120+60\times(B-R)/(G-R)$$

When $B \geq G \geq R$, $$S=B-R,\ L=(B+R)/2,\ H=240-60\times(G-R)/(B-R)$$

When $B \geq R \geq G$, $$S=B-G,\ L=(B+G)/2,\ H=240+60\times(R-G)/(B-G)$$

When $R \geq B \geq G$, $$S=R-G,\ L=(R+G)/2,\ H=360-60\times(B-G)/(R-G)$$

Therefore, the saturation S can have values of 0 to 255; the lightness L, values from 0 to 255; and the hue H, values from 0 to 360, as is apparent from the above equations.

The relationship among the saturations S, the lightnesses L, and the hues H will be described with reference to FIG. 5.

Figure 5:
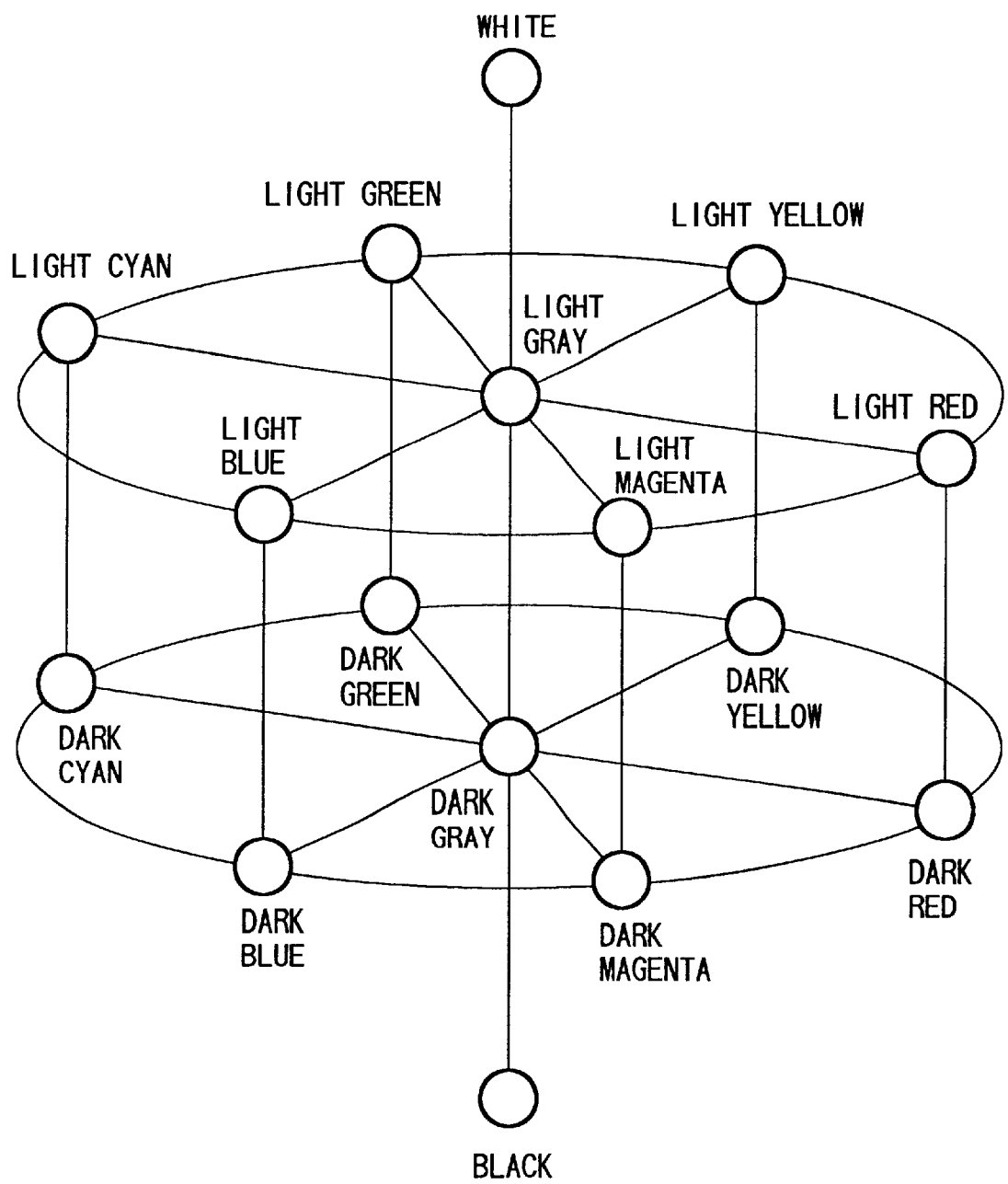
FIG. 5 is a view of a color solid representing the relationship among saturations S, lightnesses L, and hues H in the first embodiment.

FIG. 5 is a view of a color solid representing the relationship among the saturations S, the lightnesses L, and the hues H in the first embodiment.

As shown in FIG. 5, the color solid represents the lightness L along the vertical direction, the saturation S along the radial direction of the circle, and the hue H by an angle of the circle, and 16 colors expressible on the LCD 14, which are shown in FIG. 29, are arranged on this color solid. As is apparent from FIG. 5, there are four expressible achromatic colors and 12 expressible chromatic colors.

The description will be continued referring back to FIG. 4.

Reference numeral 106 denotes an achromatic color/chromatic color classification unit for classifying a color used in image data as an achromatic color or a chromatic color on the basis of the saturation S calculated by the saturation calculation unit 103. In this case, four colors are classified as achromatic colors, and the remaining 12 colors are classified as chromatic colors in the ascending order of saturations S.

Reference numeral 107 denotes an achromatic color/lightness order assignment unit for assigning each of the four colors classified as achromatic colors by the achromatic color/chromatic color classification unit 106 to one of expressible achromatic colors on the basis of the lightness L calculated by the lightness calculation unit 104. In this case, white, light gray, dark gray, and black are assigned to the four colors in the descending order of lightnesses L.

Reference numeral 108 denotes a chromatic color/hue order assignment unit 108 for assigning each of the 12 colors classified as chromatic colors by the achromatic color/chromatic color classification unit 106 to one of expressible chromatic colors on the basis of the hue H calculated by the hue calculation unit 105. According to the color solid shown in FIG. 5, two colors having different lightnesses can be expressed in correspondence with each of six hues. Therefore, the chromatic color/hue order assignment unit 108 assigns the 12 colors classified as chromatic colors to red, yellow, yellow, green, green, cyan, cyan, blue, blue, magenta, magenta, and red, respectively, in the ascending order of hues H.

Reference numeral 109 denotes a hue/lightness order assignment unit for assigning two colors which are assigned to the same hue to expressible light and dark colors corresponding to the hue in the descending order of lightnesses L.

With the above processing, the 16 colors used in the image data are assigned to 16 expressible colors, respectively. This correspondence is stored as a color conversion table 110.

R, G, and B values of each pixel of the image data input to the image input unit 101 are converted in accordance with the color conversion table 110 and output to an image output unit 111. With this processing, all the R, G, and B values of pixels of the image data input to the image input unit 101 can be converted into R, G, and B values which can be expressed on the LCD 14. The image data which has undergone color conversion by the color conversion unit 45 is temporarily stored in the VRAM 8 and displayed on the LCD 14 under the control of the LCD I/F 7. FIG. 6 shows results obtained when the color conversion unit 45 of the first embodiment performs color conversion for the image data input to the image input unit 101. As shown in FIG. 6, even after the 16 colors distinguished in the input image data are converted into expressible colors, the image data still includes 16 colors. In addition, since color conversion is performed on the basis of the hues, lightnesses, and saturations of colors used in the input image data, color conversion can be realized while preserving the hues, lightnesses, and saturations of colors used in the input image data to some extent. Therefore, the input image data can be more faithfully displayed on the LCD 14.

When the R, G, and B values of image data directly represent pixel values, the pixel values are stored in the VRAM 8. When the R, G, and B values are stored in a color palette, palette numbers corresponding to the R, G, and B values are output to the VRAM 8.

The flow of processing in the color conversion unit 45 of the first embodiment will be described next with reference to the flow chart shown in FIG. 7.

Figure 7:
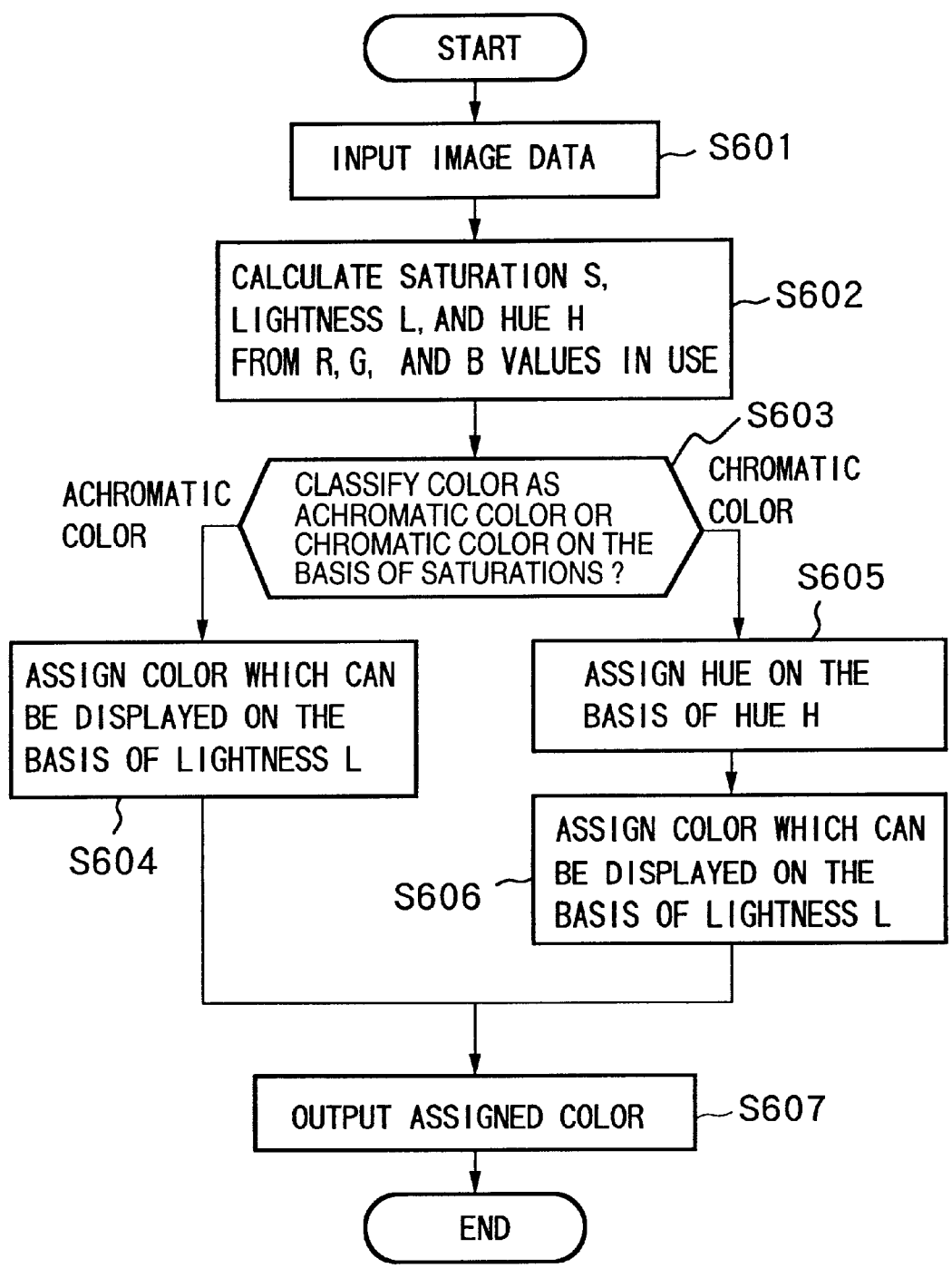
FIG. 7 is a flow chart showing the flow of processing in the color conversion unit 45 of the first embodiment.

FIG. 7 is a flow chart showing the flow of processing in the color conversion unit of the first embodiment.

In step S601, image data generated by the image generation computer 22 is input to the image input unit 101. In step S602, the image use color RGB value input unit 102 acquires R, G, and B values used in the image data input to the image input unit 101. The saturation calculation unit 103, the lightness calculation unit 104, and the hue calculation unit 105 calculate the saturation S, the lightness L, and the hue H of each color, respectively, on the basis of the acquired R, G, and B values. In step S603, the achromatic color/chromatic color classification unit 106 classifies each color used in the image data as an achromatic color or a chromatic color on the basis of the saturation S. For an achromatic color, the flow advances to step S604. For a chromatic color, the flow advances to step S605.

In step S604, the achromatic color/lightness order assignment unit 107 assigns the color classified as an achromatic color to a color expressible on the LCD 14 on the basis of the lightness L.

In step S605, the chromatic color/hue order assignment unit 108 assigns the color classified as a chromatic color to a hue expressible on the LCD 14 on the basis of the hue H.

In step S606, the hue/lightness order assignment unit 109 assigns colors which are assigned to the same hue to colors expressible on the LCD 14 on the basis of the lightnesses L.

In step S607, the image output unit 111 outputs the assigned colors expressible on the LCD 14.

Figure 8:
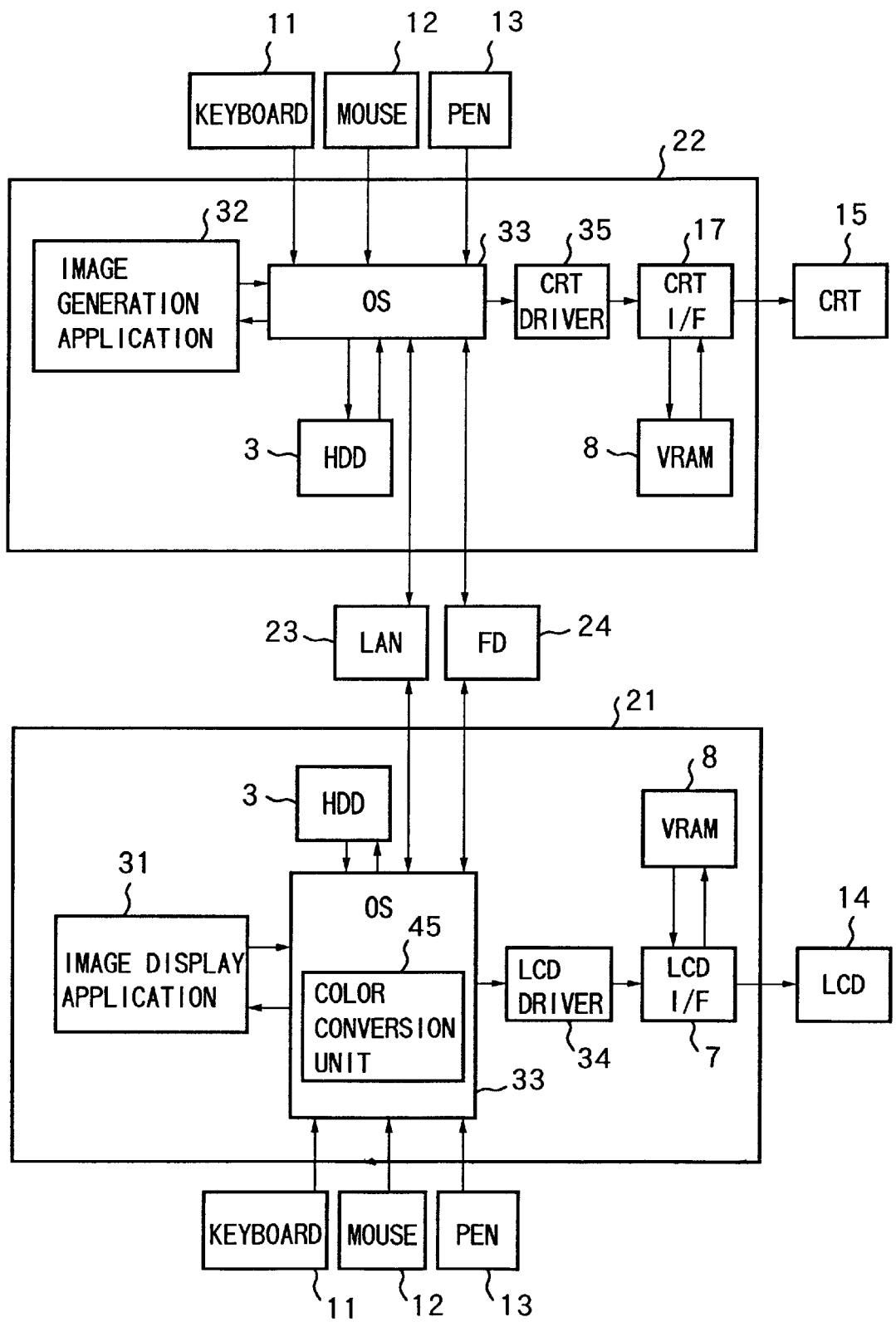
FIG. 8 is a block diagram showing the functional arrangement of the color conversion system of the first embodiment in which the color conversion unit 45 is arranged in an OS 33.
Figure 9:
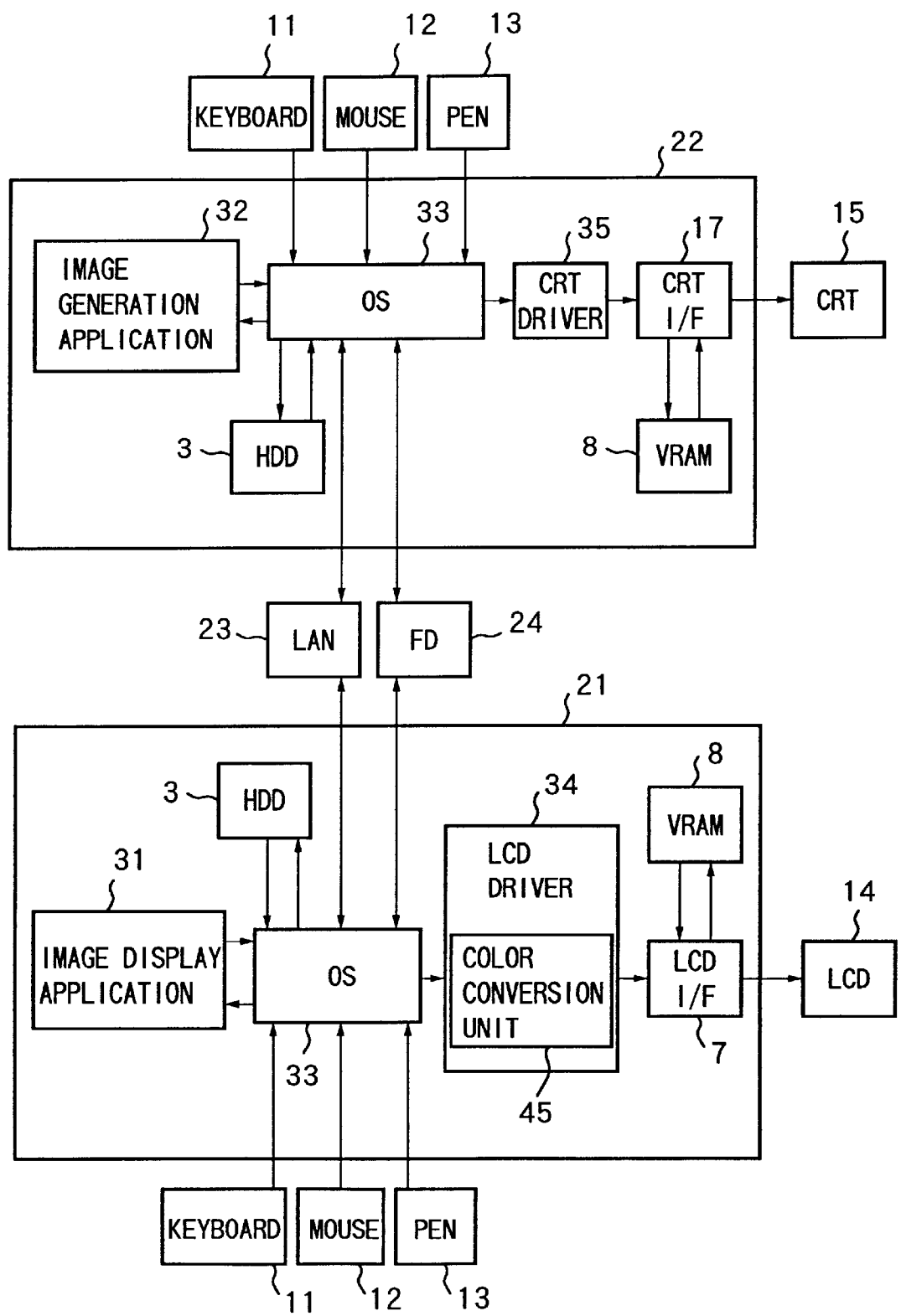
FIG. 9 is a block diagram showing the functional arrangement of the color conversion system of the first embodiment in which the color conversion unit 45 is arranged in an LCD driver 34.

As shown in FIG. 8, the color conversion unit 45 may be arranged in the OS 33. Alternatively, the color conversion unit 45 may be arranged in the LCD driver 34, as shown in FIG. 9.

When the color conversion unit 45 is arranged in the image display application 31, as described above, the effect of the present invention can be obtained for the application even using a conventional OS without the function of the color conversion unit 45. When the color conversion unit 45 is arranged in the OS 33, as shown in FIG. 8, the effect of the present invention can be obtained for a designated window even using a conventional application without the function of the color conversion unit 45. When the color conversion unit 45 is arranged in the LCD driver 34, as shown in FIG. 9, the effect of the present invention can be obtained for the entire screen of the LCD 14 even using a conventional application or OS.

As described above, according to the first embodiment, since the color conversion unit 45 is arranged, colors used in image data generated by the image generation computer 22 can be properly assigned to colors expressible on the LCD 14 while reflecting the hues, lightnesses, and saturations of the colors to some extent. In addition, assignment of colors used in the image data generated by the image generation computer 22 to colors expressible on the LCD 14 can be realized without using pseudo halftone processing such as dithering or error diffusion. Therefore, lines or characters can also be clearly displayed on the LCD 14.

Second Embodiment

Figure 28:
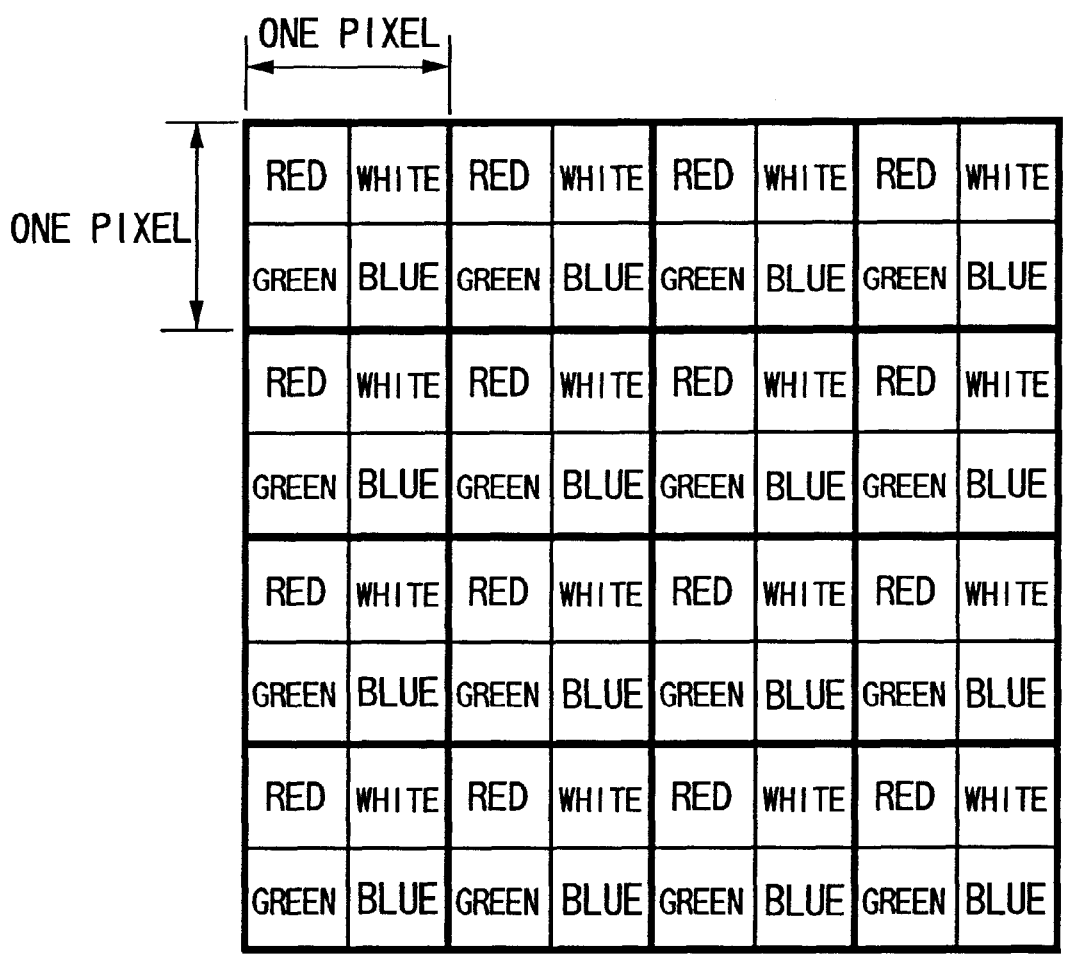
FIG. 28 is a view showing the pixel arrangement of a conventional 16-color display.

In the first embodiment, the LCD 14 has the arrangement shown in FIG. 28. In the second embodiment, an LCD 14 has an arrangement shown in FIG. 10. In this case, one pixel is constituted by three red subpixels, three green subpixels, and three blue subpixels. Each color can take four values from 0 to 3 depending on the number of ON subpixels. By combining the subpixels, 64 colors can be expressed. Since image data to be handled in the second embodiment is image data of a map, a graph, or a CAD including pieces of graphic or character information distinguished using a relatively small number of colors, arbitrary 64 or less colors of 16,777,216 colors are used. For the descriptive convenience, the number of colors used in image data is assumed to be 64.

Figure 12:
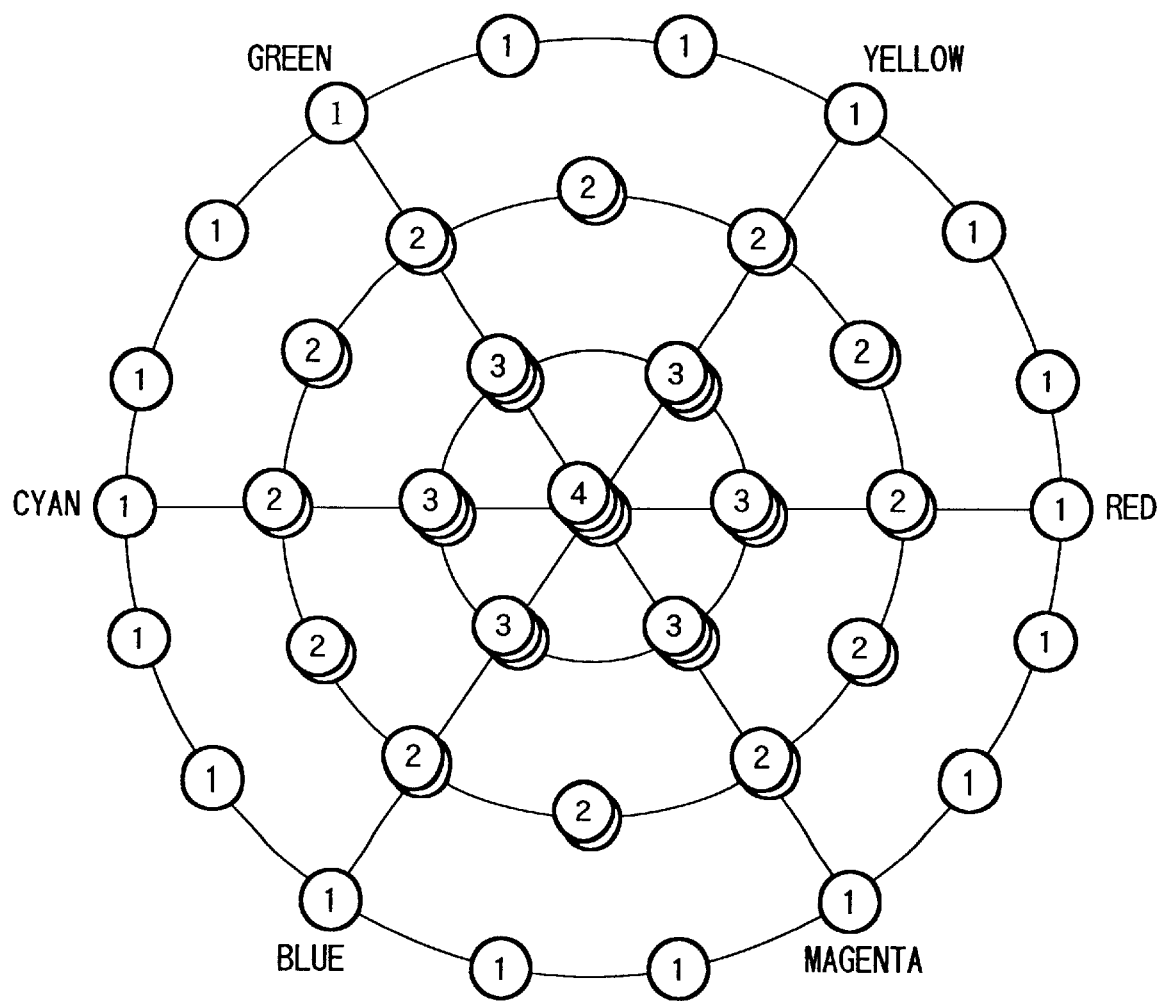
FIG. 12 is a plan view of the color solid representing the relationship among the saturations S, the lightnesses L, and the hues H in the second embodiment.
Figure 13:
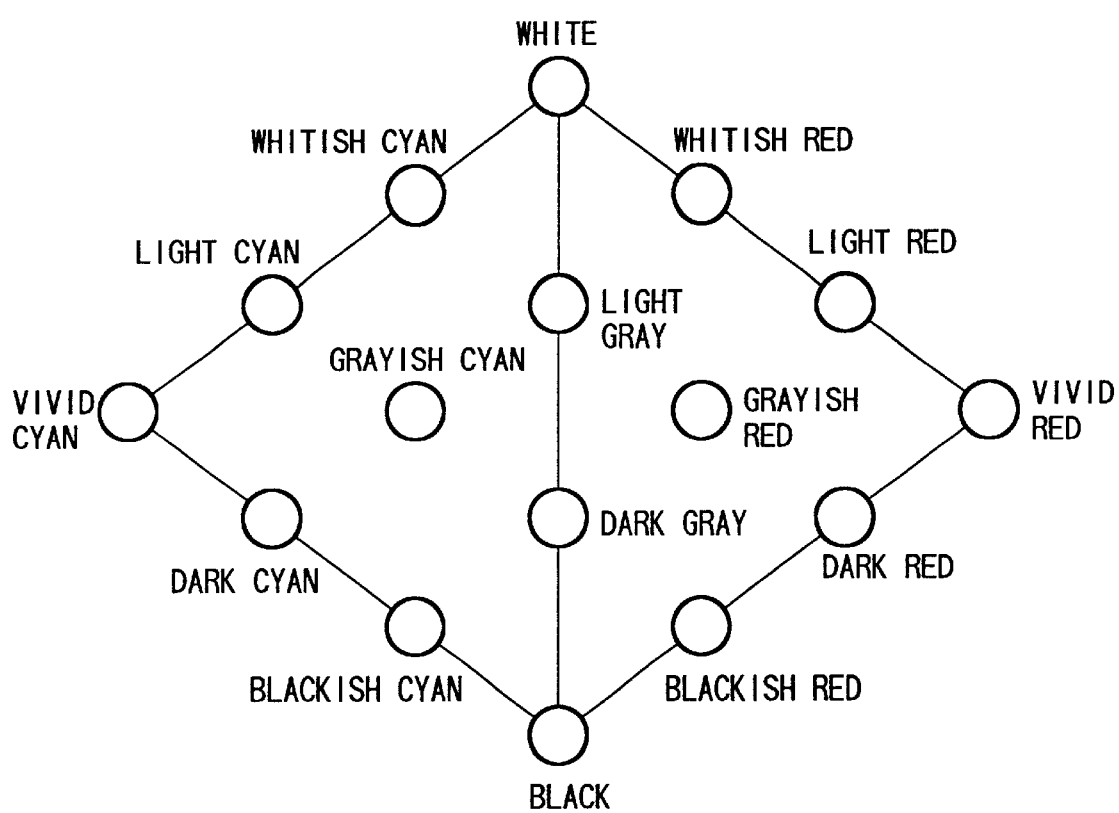
FIG. 13 is a sectional view of the color solid representing the relationship among the saturations S, the lightnesses L, and the hues H in the second embodiment.

The relationship among saturations S, lightnesses L, and hues H will be described with reference to FIGS. 11, 12, and 13.

Figure 11:
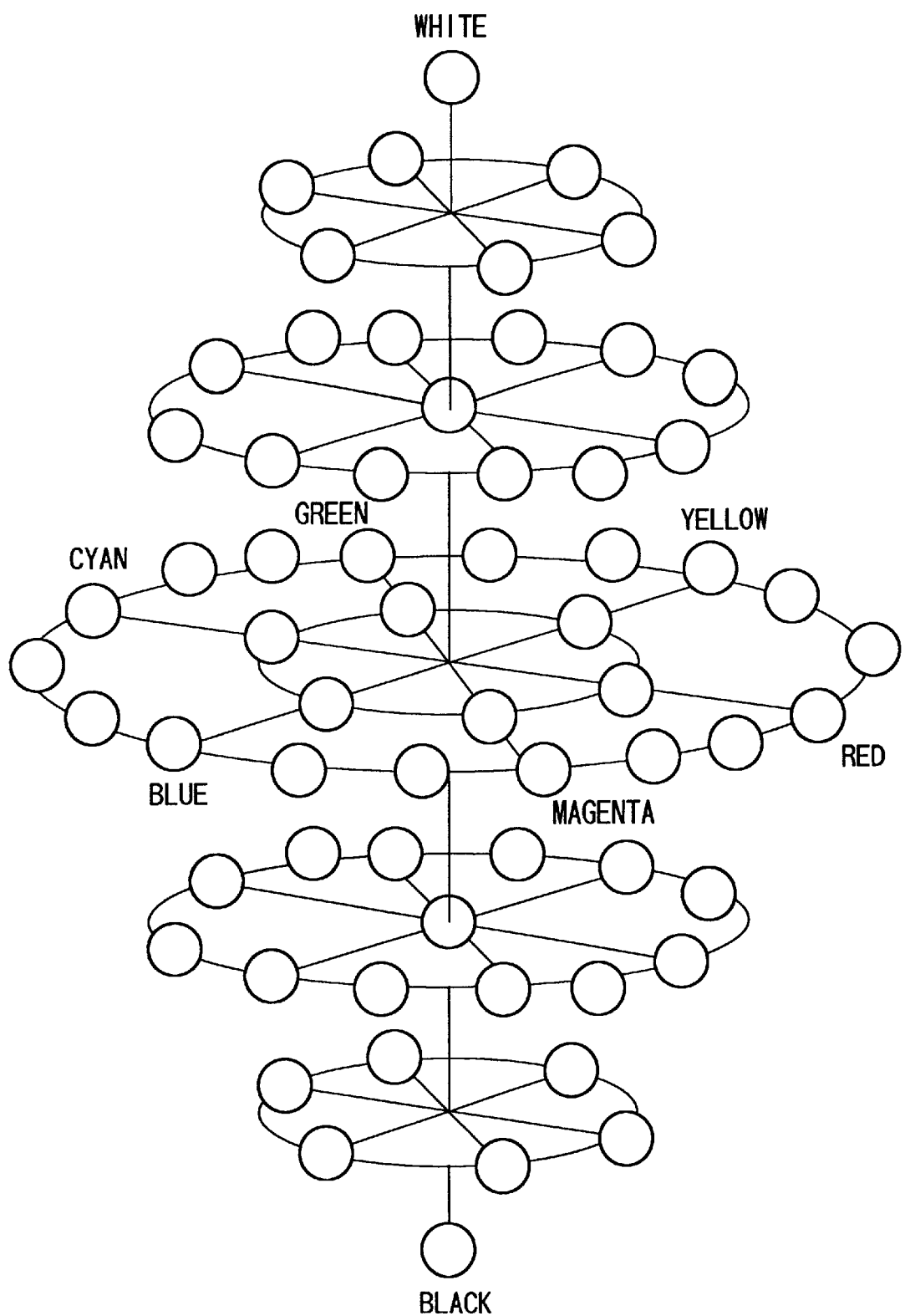
FIG. 11 is a view of a color solid representing the relationship among saturations S, lightnesses L, and hues H in the second embodiment.

FIG. 11 shows a color solid representing the relationship among the saturations S, the lightnesses L, and the hues H in the second embodiment. FIG. 12 is a plan view, and FIG. 13 is a sectional view of the color solid. In the plan view of FIG. 12, an encircled number indicates the number of overlapping colors.

Even when the number of colors expressible on the LCD 14 is different from that of the first embodiment, color conversion may be executed basically on the basis of the same concept. When the number of colors of the LCD 14 is large, the hue/lightness order assignment unit 109 of the first embodiment shown in FIG. 4 cannot uniquely assign colors used in image data input to an image input unit 101 to colors expressible on the LCD 14 in some cases. According to FIG. 13, vivid red and grayish red have the same hue and lightness. For this reason, the hue/lightness order assignment unit 109 assigns the same hue and lightness to a plurality of colors. For yellow, green, cyan, blue, and magenta as well, the same hue and lightness are assigned to a plurality of colors.

In the second embodiment, a color conversion unit 45 has a lightness/saturation order assignment unit 112 (FIG. 14), unlike the color conversion unit 45 of the first embodiment shown in FIG. 4, thereby solving the problem that the same hue and lightness are assigned to a plurality of colors. More specifically, the lightness/saturation order assignment unit 112 assigns vivid and grayish colors of a hue to the plurality of colors to which the same hue and lightness are assigned by a hue/lightness order assignment unit 109, in the descending order of saturations S of the plurality of colors, thereby solving the above problem.

Processing in the color conversion unit 45 of the second embodiment is the same as in the color conversion unit 45 of the first embodiment except processing executed by the lightness/saturation order assignment unit 112, and a detailed description thereof will be omitted.

The flow of processing in the color conversion unit 45 of the second embodiment will be described next with reference to the flow chart shown in FIG. 15.

Figure 15:
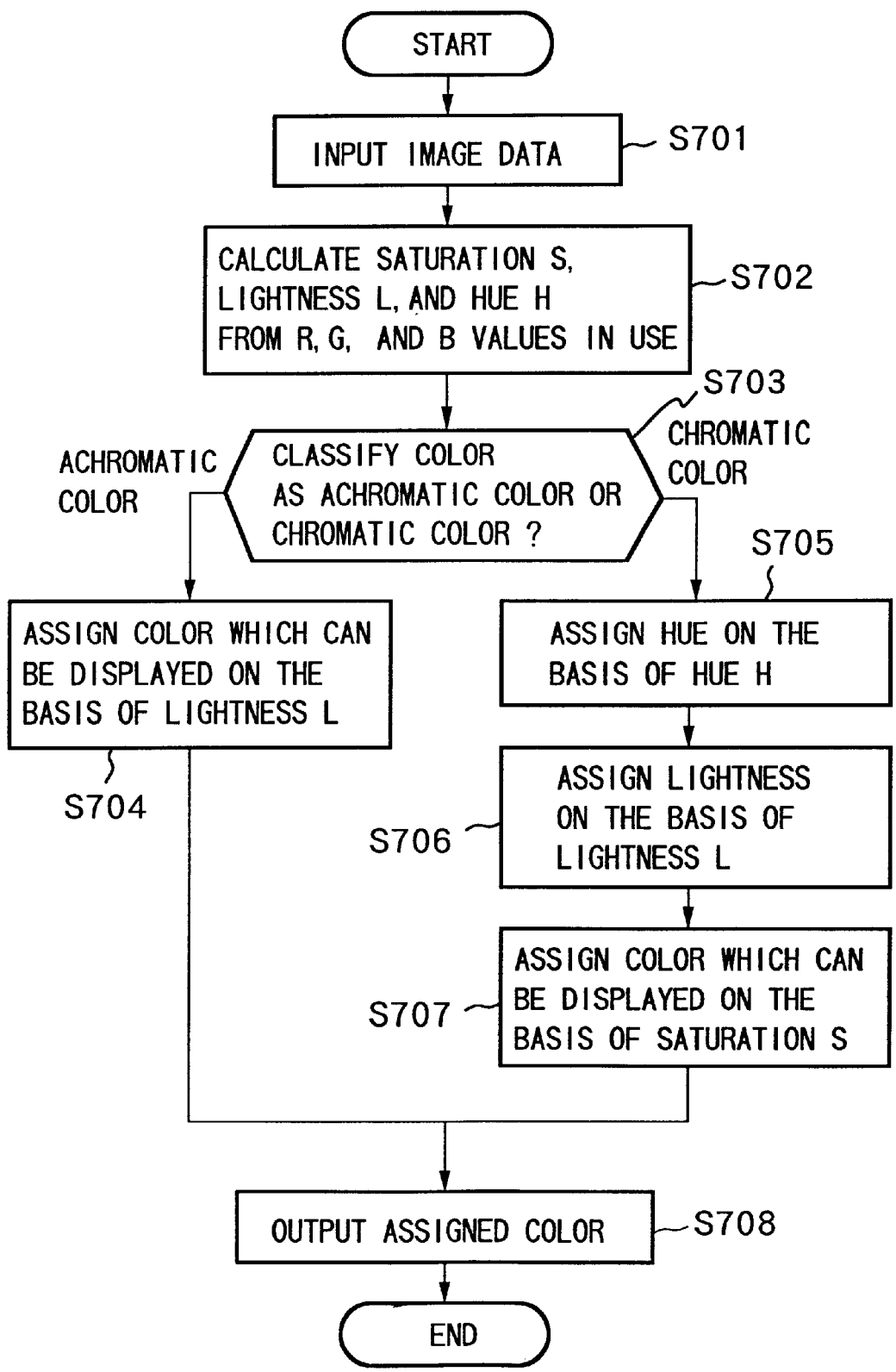
FIG. 15 is a flow chart showing the flow of processing in the color conversion unit 45 of the second embodiment.

FIG. 15 is a flow chart showing the flow of processing in the color conversion unit of the second embodiment.

In step S701, image data generated by an image generation application 32 is input to the image input unit 101. In step S702, an image use color RGB value input unit 102 acquires R, G, and B values used in the image data input to the image input unit 101. A saturation calculation unit 103, a lightness calculation unit 104, and a hue calculation unit 105 calculate the saturation S, the lightness L, and the hue H of each color, respectively, on the basis of the acquired R, G, and B values. In step S703, an achromatic color/chromatic color classification unit 106 classifies each color used in the image data as an achromatic color or a chromatic color on the basis of the saturation S. For an achromatic color, the flow advances to step S704. For a chromatic color, the flow advances to step S705.

In step S704, an achromatic color/lightness order assignment unit 107 assigns the color classified as an achromatic color to a color expressible on the LCD 14 on the basis of the lightness L.

In step S705, a chromatic color/hue order assignment unit 108 assigns the color classified as a chromatic color to a hue expressible on the LCD 14 on the basis of the hue H. In step S706, the hue/lightness order assignment unit 109 assigns colors which are assigned to the same hue to colors expressible on the LCD 14 on the basis of the lightnesses L. In step S707, the lightness/saturation order assignment unit 112 assigns colors which are assigned to the same hue and lightness to expressible colors on the basis of the saturations S.

In step S708, an image output unit 111 outputs the assigned colors expressible on the LCD 14.

As described above, according to the second embodiment, even when the hue/lightness order assignment unit 109 assigns the same hue and lightness to a plurality of colors because of the large number of colors expressible on the LCD 14, vivid and grayish colors corresponding to each hue, which have different saturations, can be assigned, by the lightness/saturation order assignment unit 112, to the plurality of colors to which the same hue and lightness are assigned.

More specifically, in the second embodiment, colors are classified into achromatic and chromatic colors on the basis of the saturations S, and achromatic colors are assigned in accordance with the lightnesses L. Chromatic colors are finely assigned on the basis of the hues H, the lightnesses L, and the saturations S in this order. With this processing, colors used in image data generated by the image generation application 32 can be properly assigned to colors expressible on the LCD 14 while reflecting the hues, lightnesses, and saturations of the colors to some extent.

The arrangement of the LCD 14 used to describe the first or second embodiment is not limited to this.

Figure 16:
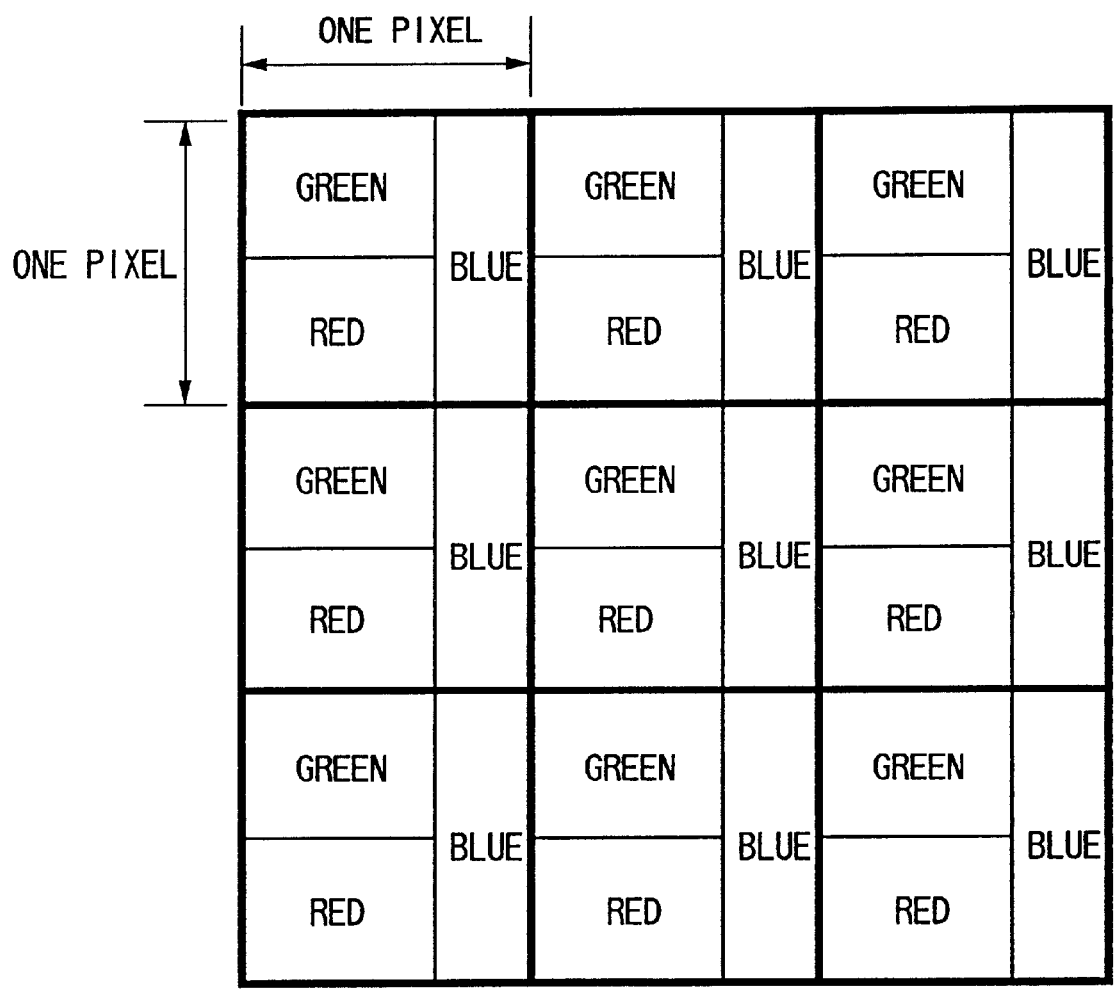
FIG. 16 is a view showing the pixel arrangement of another LCD of the second embodiment.
Figure 17:
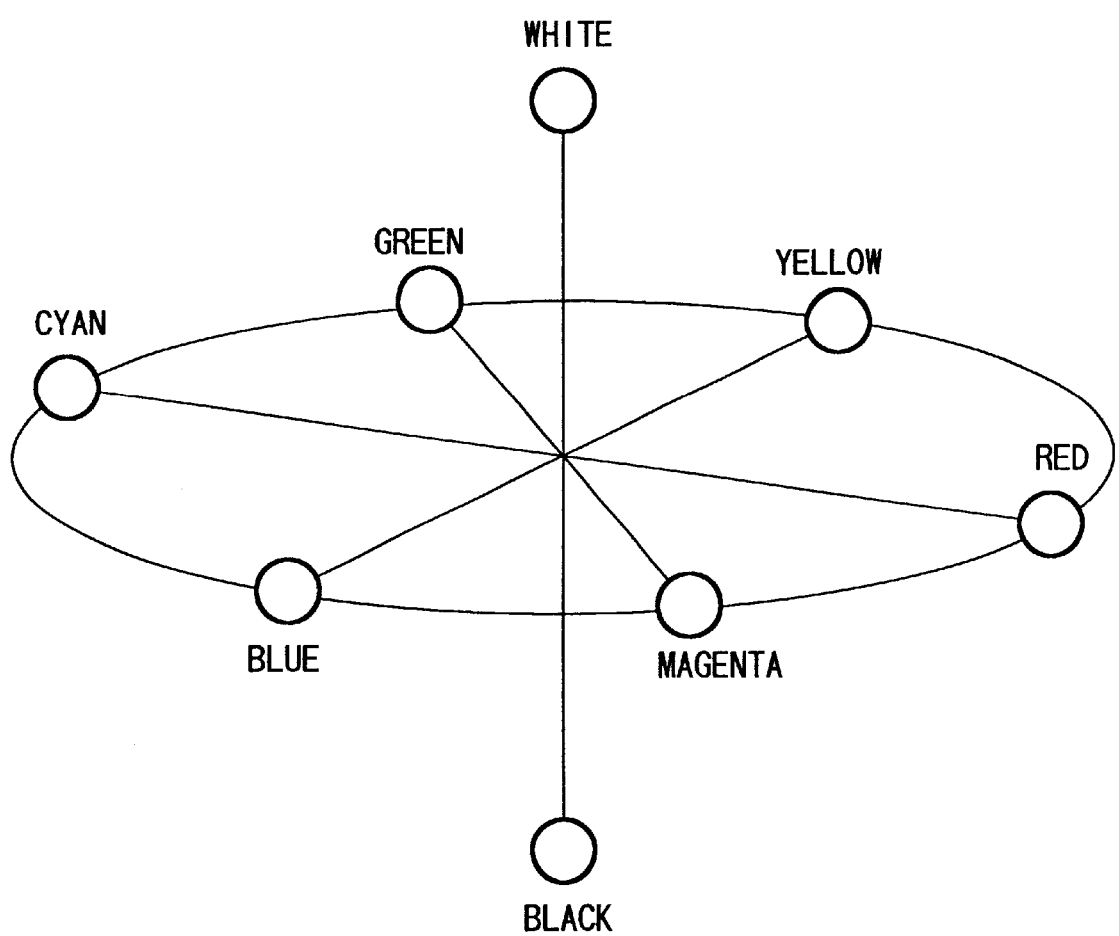
FIG. 17 is a view of a color solid representing the relationship among the saturations S, the lightnesses L, and the hues H of another LCD of the second embodiment.

When the LCD 14 has a pixel arrangement shown in FIG. 16, eight colors represented by the color solid shown in FIG. 17 can be expressed. In this case, only one lightness and one saturation can be expressed in correspondence with each hue. Therefore, the lightness/saturation order assignment unit 112 can be omitted. With this arrangement as well, the present invention can effectively function.

The display is not limited to the LCD 14. The present invention can easily be applied to another display such as a CRT or an LED.

When image data is to be output to a printer 16 through a printer I/F 9, the present invention can easily be applied.

Third Embodiment

In the first and second embodiments, it is assumed for the descriptive convenience that the number of colors used in image data generated by an image generation application 32 equals the number of colors expressible on an LCD 14.

In the third embodiment, it is assumed for further generalization that the number of colors used in image data generated by the image generation application 32 is equal to or smaller than the number of colors expressible on the LCD 14.

Figure 10:
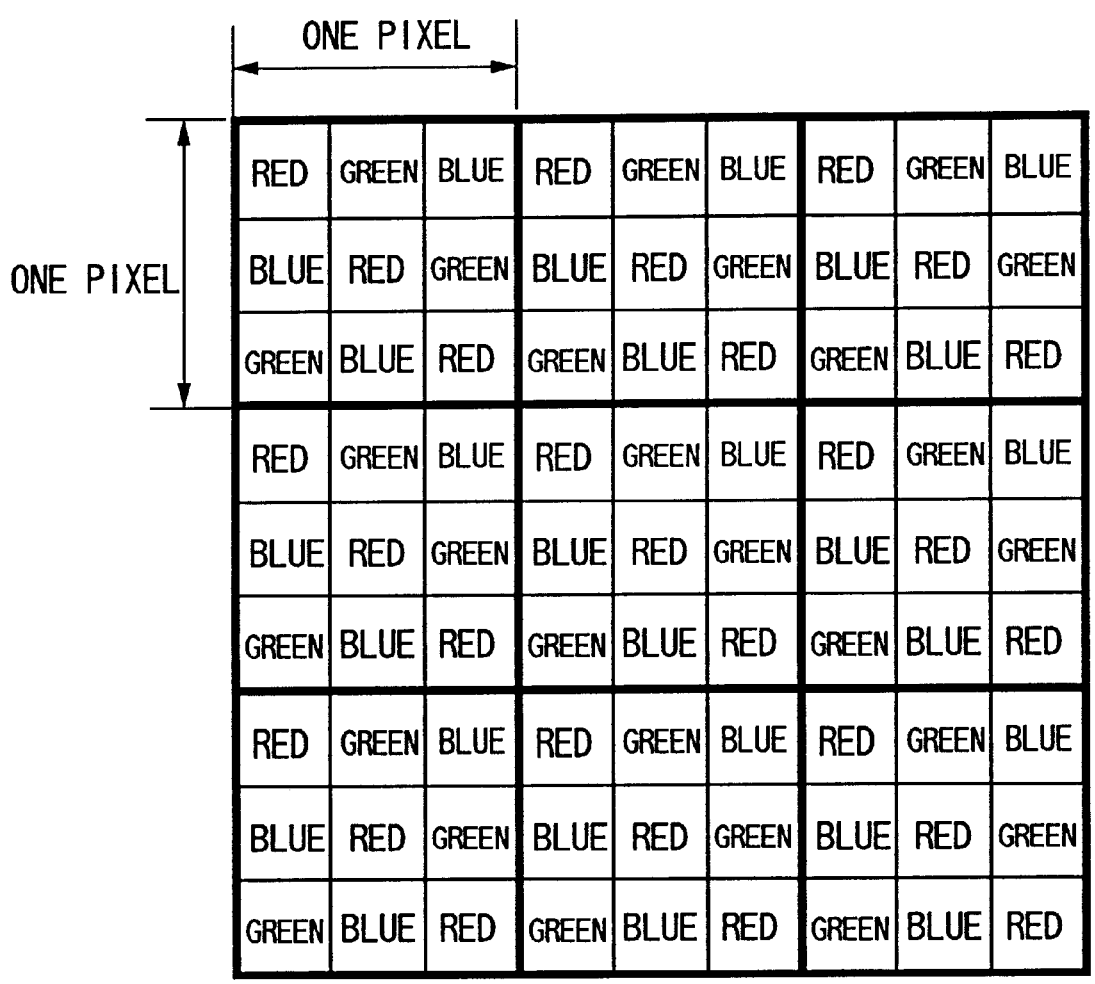
FIG. 10 is a view showing the pixel arrangement of an LCD of the second embodiment.

The LCD 14 has the arrangement of the second embodiment shown in FIG. 10, and processing in a color conversion unit 45 of the third embodiment will be described.

Figure 14:
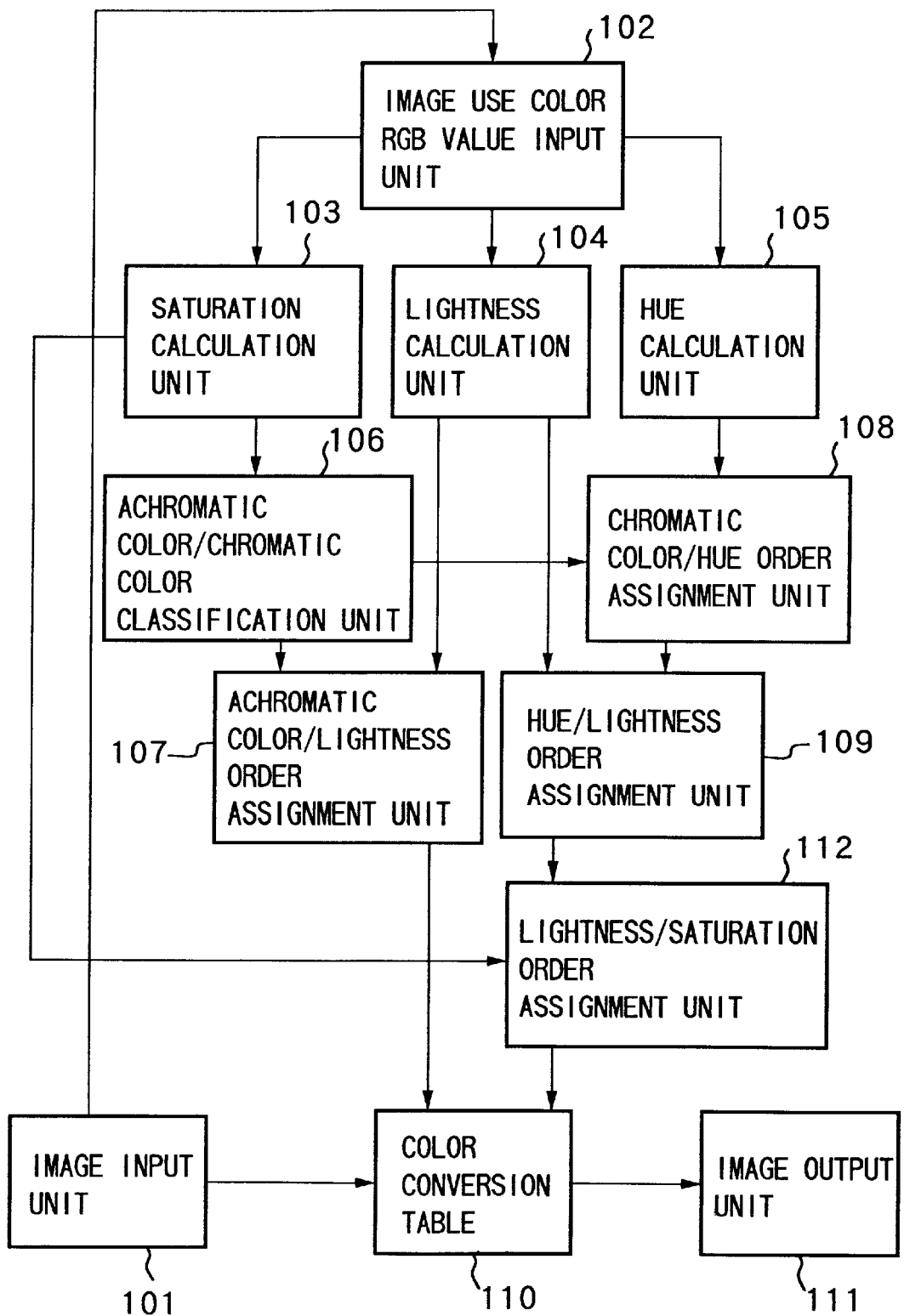
FIG. 14 is a block diagram showing a detailed arrangement of a color conversion unit 45 of the second embodiment.

In the third embodiment, the color conversion unit 45 for executing processing has the same constituent elements as those of the color conversion unit 45 of the second embodiment shown in FIG. 14, and the same reference numerals as in FIG. 14 denote the same elements in the third embodiment. Processing in the color conversion unit 45 of the third embodiment will be described below. Processing operations in an image input unit 101, an image use color RGB value input unit 102, a saturation calculation unit 103, a lightness calculation unit 104, a hue calculation unit 105, a color conversion table 110, and an image output unit 111 are the same as in the first embodiment, and a detailed description thereof will be omitted.

An achromatic color/chromatic color classification unit 106 classifies a color having a saturation S smaller than a predetermined threshold value as an achromatic color and a color whose saturation S is equal to or larger than the threshold value as a chromatic color. When the number of achromatic colors exceeds 4, the excess colors are classified as chromatic colors. When the number of chromatic colors exceeds 60, the excess colors are classified as achromatic colors.

An achromatic color/lightness order assignment unit 107 compares a lightness L with three predetermined threshold values, thereby assigning the achromatic color to white, light gray, dark gray, or black. When two colors are assigned to the same color, the second color is assigned to the next color in the order of lightnesses. When the third color is also assigned to the same color, the color is carried over to a color next to the second color in turn, or assigned to the next color in the reverse direction.

A lightness/saturation order assignment unit 112 executes the same procedure to assign colors. The numbers of predetermined threshold values are set in accordance with expressible hues, lightnesses, and saturations. In this case, the number of predetermined threshold values used by a chromatic color/hue order assignment unit 108 is 24, the number of predetermined threshold values used by a hue/lightness order assignment unit 109 is 4, and the number of predetermined threshold values used by the lightness/saturation order assignment unit 112 is 1.

The flow of processing in the color conversion unit 45 of the third embodiment will be described next with reference to the flow chart shown in FIG. 18.

Figure 18:
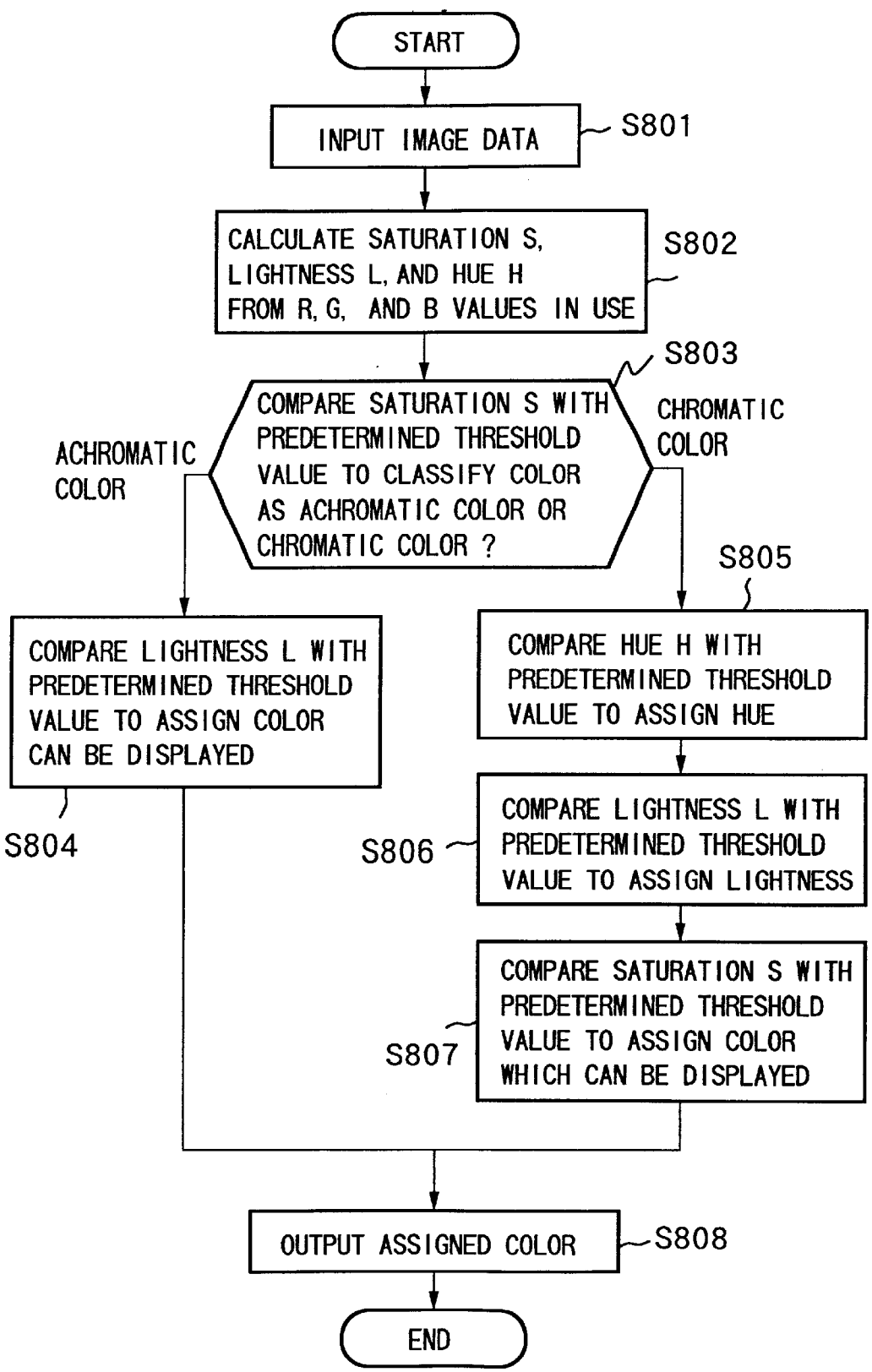
FIG. 18 is a flow chart showing the flow of processing in a color conversion unit 45 of the third embodiment.

FIG. 18 is a flow chart showing the flow of processing in the color conversion unit of the third embodiment.

In step S801, image data generated by the image generation application 32 is input to the image input unit 101. In step S802, the image use color RGB value input unit 102 acquires R, G, and B values used in the image data input to the image input unit 101. The saturation calculation unit 103, the lightness calculation unit 104, and the hue calculation unit 105 calculate the saturation S, the lightness L, and a hue H of each color, respectively, on the basis of the acquired R, G, and B values. In step S803, the achromatic color/chromatic color classification unit 106 compares the saturation S with a predetermined threshold value, thereby classifying each color used in the image data as an achromatic color or a chromatic color. For an achromatic color, the flow advances to step S804. For a chromatic color, the flow advances to step S805.

In step S804, the achromatic color/lightness order assignment unit 107 compares the lightness L with three predetermined threshold values, thereby assigning the color classified as an achromatic color to a color expressible on the LCD 14.

In step S805, the chromatic color/hue order assignment unit 108 compares the hue H with 24 predetermined threshold values, thereby assigning the color classified as a chromatic color to a hue expressible on the LCD 14. In step S806, the hue/lightness order assignment unit 109 compares the lightness L with four predetermined threshold values, thereby assigning colors which are assigned to the same hue to colors expressible on the LCD 14. In step S807, the lightness/saturation order assignment unit 112 compares the saturation S with a predetermined threshold value, thereby assigning colors which are assigned to the same hue and lightness to expressible colors.

In step S808, the image output unit 111 outputs the assigned colors expressible on the LCD 14.

As described above, according to the third embodiment, when the number of colors used in image data generated by the image generation application 32 is equal to or smaller than the number of colors expressible on the LCD 14, the same effect as in the first and second embodiments can be obtained.

In the third embodiment, the number of colors expressible on the LCD 14 is 64. However, the present invention is not limited to this. As far as the number of colors used in image data generated by the image generation application 32 is equal to or smaller than the number of colors expressible on the LCD 14, the present invention can be applied to arbitrary image data.

Fourth Embodiment

In the first, second, and third embodiments, color conversion processing is performed for one window or the entire screen. In the fourth embodiment, color conversion processing is performed for a plurality of windows on the screen in a multi-window mode.

The fourth embodiment can be applied to both a case wherein a color conversion unit 45 is arranged in an image display application 31, as shown in FIG. 2, and a case wherein the color conversion unit 45 is arranged in an OS 33, as shown in FIG. 8.

Assume that the first window, the second window, and the third window are displayed on the screen in the multi-window mode. First, all images are subjected to pseudo halftone processing and displayed. A case wherein the first and second images are subjected to color conversion processing of the present invention and newly displayed will be described.

As shown in FIG. 19, the first image uses 12 colors, i.e., white, gray, black, red, orange, yellow, green, blue green, blue, purple, red purple, and flesh. The second image uses 10 colors, i.e., white, gray, black, red, orange, yellow, brown, aqua blue, navy blue, and pink.

When colors in the first image and those in the second image are not particularly associated with each other, the 12 colors in the first image and the 10 colors in the second image may be independently converted. With the method described in the third embodiment, color conversion results shown in FIG. 19 are obtained. The first and second images use the same orange color (R=235, G=97, and B=3). The color conversion result for the first image is dark red, and that for the second image is dark yellow, so no coloring unity is present between the first image and the second image. However, the error to the original color in each image is relatively small.

When both the first and second images are map data and use common coloring, e.g., national roads are represented by red, and contours are represented by orange, it is convenient that the same color conversion result is obtained for a commonly used color. In this case, 16 colors used at least in either the first or second image, i.e., white, gray, black, red, orange, yellow, green, blue green, blue, purple, red purple, flesh, brown, aqua blue, navy blue, and pink may be subjected to color conversion. When the method described in the third embodiment is used, color conversion results shown in FIG. 20 are obtained. The first and second images use the same orange color (R=235, G=97, and B=3), and the color conversion result is dark yellow for both the first and second images. There is coloring unity between the first image and the second image.

Figure 21:
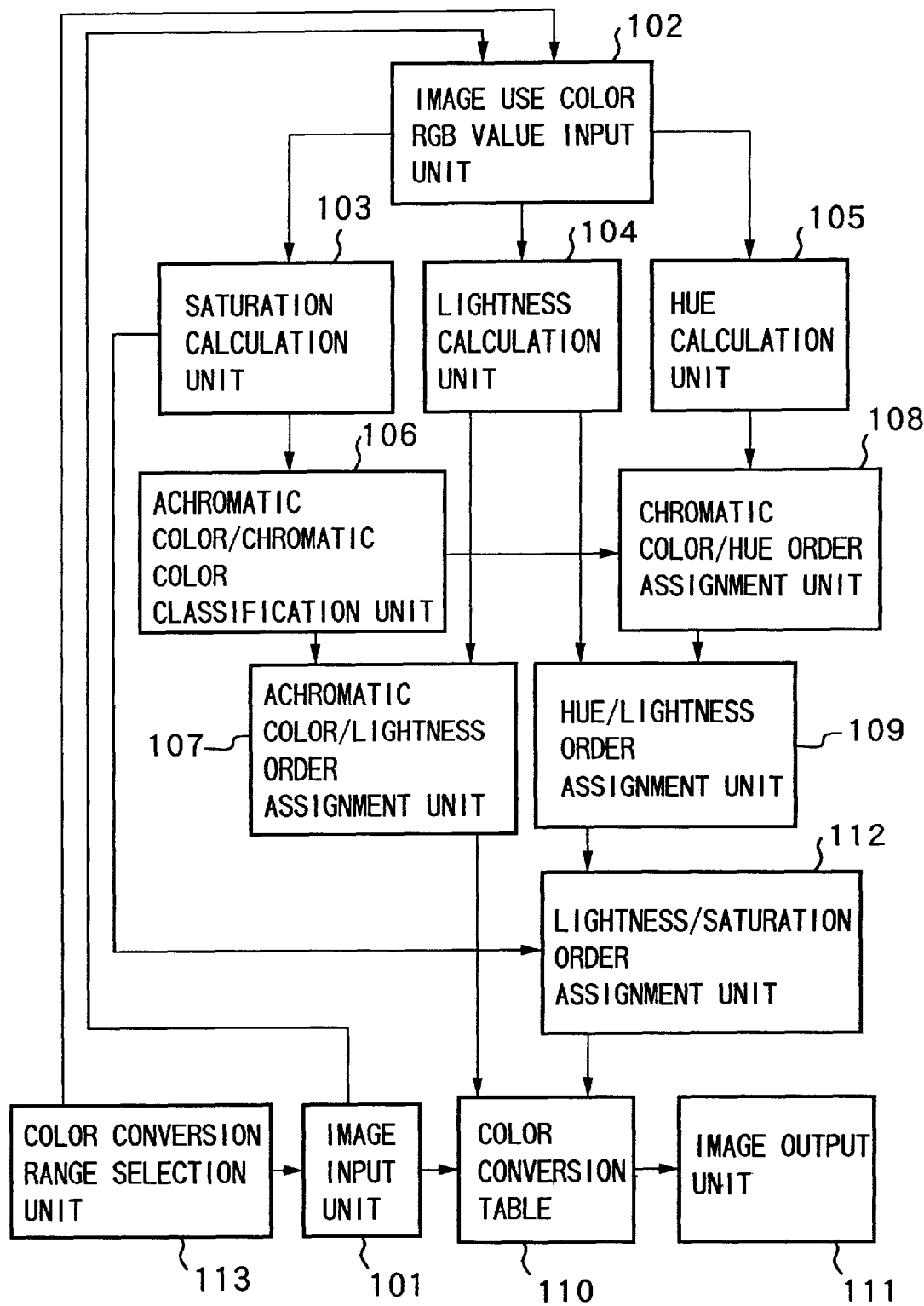
FIG. 21 is a block diagram showing a detailed arrangement of the color conversion unit 45 of the fourth embodiment.

In the fourth embodiment, to realize this operation, a color conversion range selection unit 113 is arranged, as shown in FIG. 21, to select the first and second windows in accordance with an instruction from a mouse 12 or a pen 13. When an operation of starting color conversion processing of the present invention is performed, the first image and the second image are sent to an image input unit 101 and subjected to color conversion processing, so that images as color conversion results are displayed.

Processing for two windows has been described above. This also applies to three or more windows.

In a normal multi-window mode, when the second window is clicked with the mouse 12 or the pen 13 while the first window is being selected, the second window is selected, and selection of the first window is canceled. A plurality of windows must be selected by some technique.

As one technique, windows are clicked with the mouse 12 or the pen 13 while keeping the shift key of a keyboard 11 depressed, as shown in FIG. 22. With this operation, a new window is selected without canceling selection of the current window.

As another technique, a list representing the states of generated windows is displayed, and columns of windows to be selected are checkmarked to select a plurality of windows, as shown in FIG. 23.

As described above, according to the fourth embodiment, windows for which color conversion processing is to be commonly performed are selected from a plurality of windows. With this arrangement, the meaning of coloring is united for the plurality of images, resulting in easy understanding. Color conversion does not affect windows which are not selected. Therefore, optimum color conversion processing can be performed for each window image.

Fifth Embodiment

In the first, second, third, and fourth embodiments, assignment of colors used in a generated image by color conversion processing is determined on the basis of the relationship to other colors. For this reason, there is no guarantee that a predetermined color used in the generated image is assigned to a specific color.

This processing suffices when a plurality of image data only need be distinguished by different colors, and no specific color assignment is required.

However, for, e.g., a map image, a specific color is sometimes supposed to represent a predetermined meaning, e.g., red for national roads, and orange for contours.

In the fifth embodiment, a means for unconditionally assigning some predetermined colors used in a generated image to specific colors is arranged.

Figure 24:
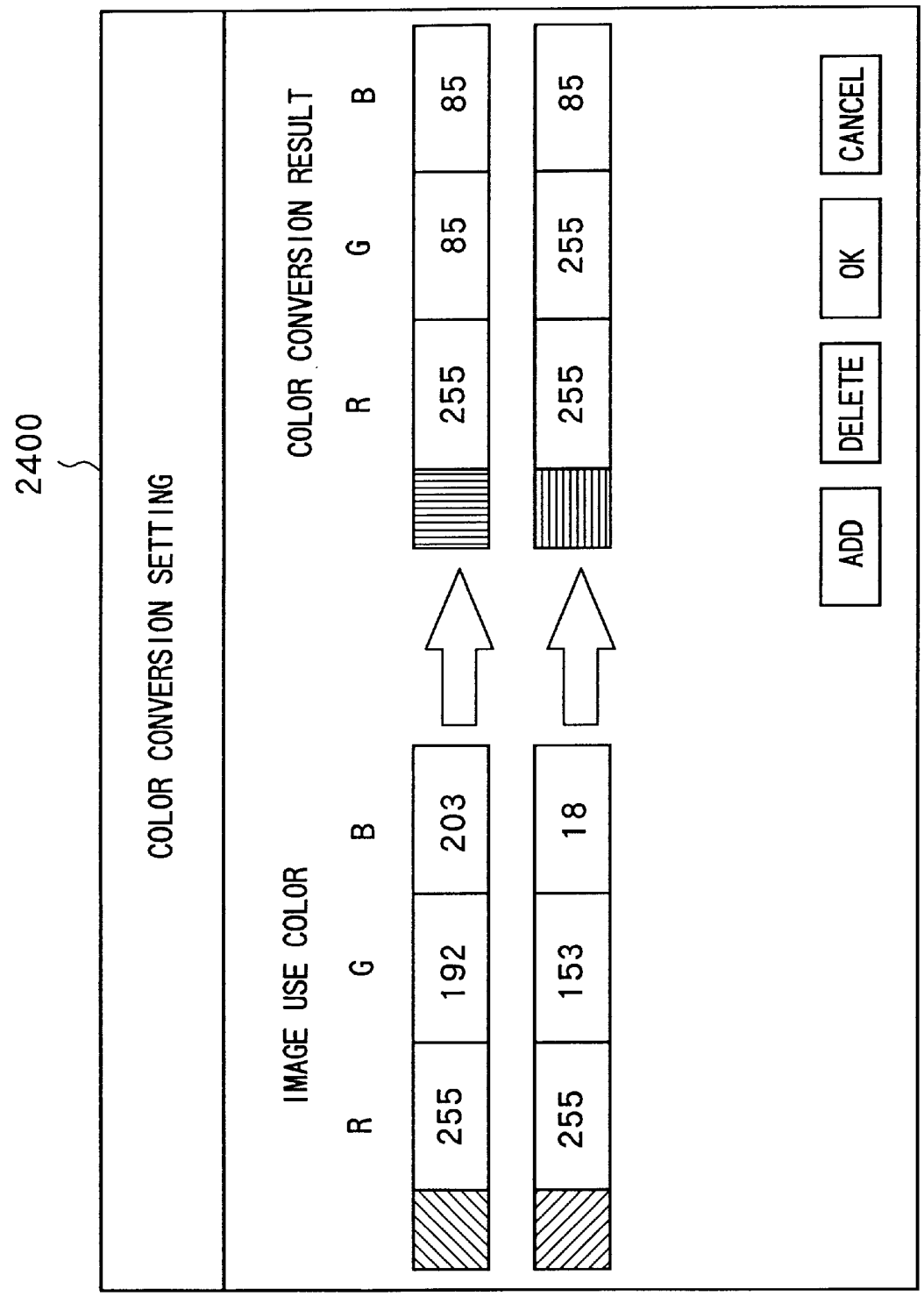
FIG. 24 is a view showing a color conversion setting window for setting colors used in a generated image, which are to be assigned to specific colors, using an image display application 31 in the fifth embodiment.

FIG. 24 shows a color conversion setting window 2400 for setting colors used in a generated image, which are to be assigned to specific colors. The R, G, and B values of image use colors and conversion results can be edited. Sets of image use colors and conversion results to be set can be added or deleted by clicking the "add" or "delete" button. When the "OK" button is clicked, set values are stored in the memory and referred to in subsequent color conversion processing.

The color conversion processing operation of the fifth embodiment is almost the same as in the first, second, third, and fourth embodiments. In the third embodiment, the achromatic color/chromatic color classification unit 106 classifies a color having a saturation S smaller than a predetermined threshold value as an achromatic color and a color whose saturation S is equal to or larger than the threshold value as a chromatic color. When the number of achromatic colors exceeds 4, the excess colors are classified as chromatic colors. When the number of chromatic colors exceeds 60, the excess colors are classified as achromatic colors.

In the fifth embodiment, however, for colors set in the color conversion setting window 2400, when color conversion results are chromatic colors, the colors are unconditionally classified as chromatic colors, and when they are achromatic colors, the colors are always classified as achromatic colors. Therefore, achromatic colors except 4 achromatic colors, which are to be classified as chromatic colors, and chromatic colors except 60 chromatic colors, which are classified as achromatic colors, are selected from colors other than those set in the color conversion setting window 2400.

In the third embodiment, the achromatic color/lightness order assignment unit 107 compares a lightness L with three predetermined threshold values, thereby assigning the color to white, light gray, dark gray, or black. When two colors are assigned to the same color, the second color is assigned to the next color in the order of lightnesses. When the third color is also assigned to the same color, the color is carried over to a color next to the second color in turn, or assigned to the next color in the reverse direction. In the fifth embodiment, however, for colors set in the color conversion setting window 2400, the colors set as conversion results are always assigned to the lightnesses. Therefore, when a color is to be assigned to the next color, carried over in turn, or assigned to the next color in the reverse direction, the colors set in the color conversion setting window 2400 are skipped.

A chromatic color/hue order assignment unit 108 executes the same procedure to assign colors.

In the color conversion setting window 2400, different image use colors may be set to the same color conversion result. For example, assume that when color conversion is to be commonly performed for a plurality of images, as in the fourth embodiment, national roads in map image 1 are represented by red, and those in map image 2 are represented by orange. If the national roads are to be displayed by the same color in both image 1 and image 2, the image use colors, red and orange, may be set to have the same color conversion result in the color conversion setting window 2400.

Figure 25:
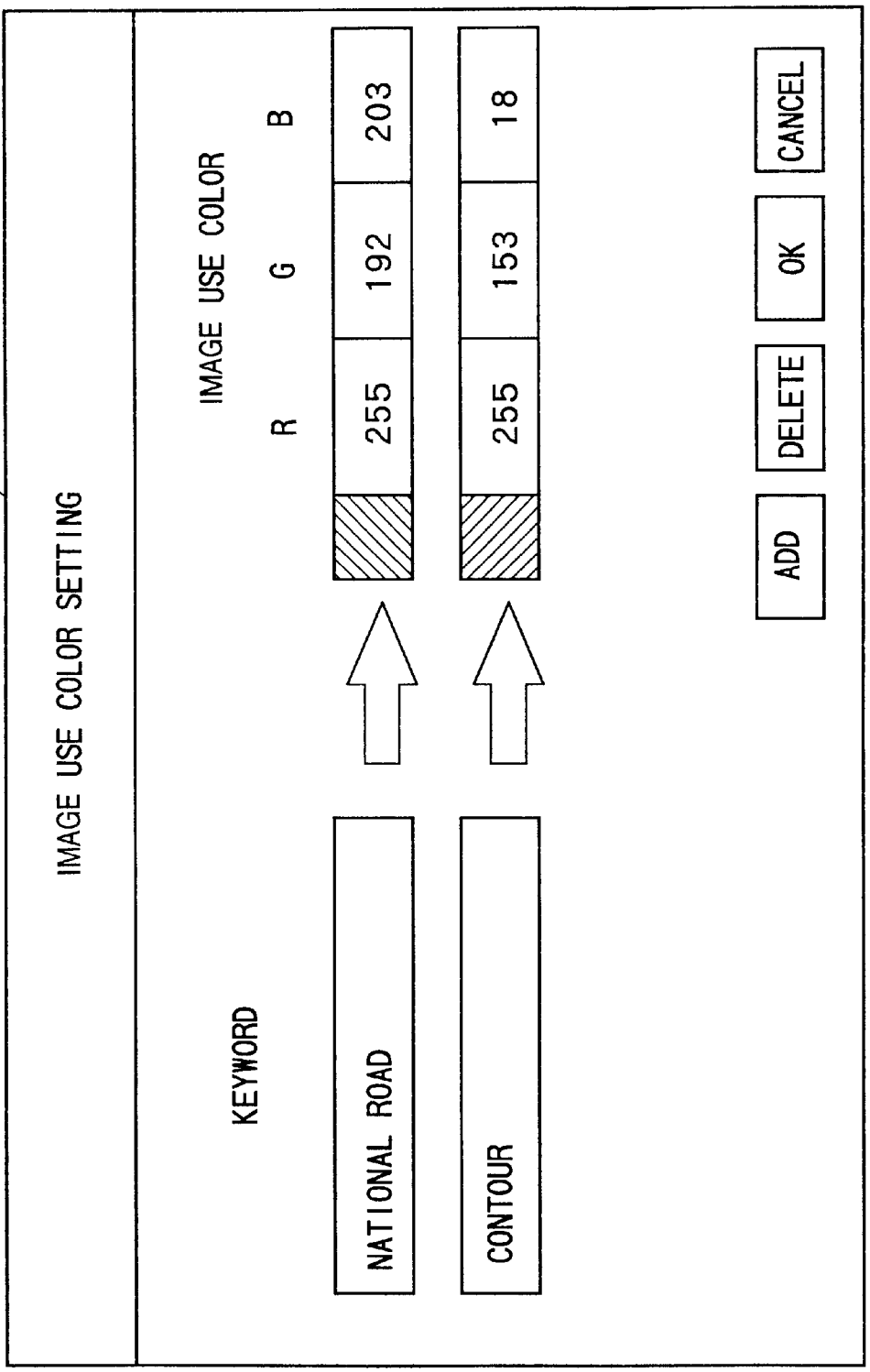
FIG. 25 is a view showing an image use color setting window for storing keywords and corresponding R, G, and B values using an image generation application 32 in the fifth embodiment.

An image generation application 32 may have a means for storing a keyword such as "national road" or "contour" in correspondence with R, G, and B values in an image use color setting window 2500 as shown in FIG. 25. With this another example of the color conversion setting window in an image display application 31, a character string such as "national road" or "contour" can be used as a keyword, and R, G, and B values which are made to correspond to the keyword in advance can be set as a color conversion result, as shown in FIG. 26. With this arrangement, when the image display application 31 is commonly used for different purposes such as a map, a graph, and a CAD, setting for a specific purpose does not affect another purpose where the meanings of colors are different.

As described above, according to the fifth embodiment, a means for always assigning some predetermined colors used in generated image data, or predetermined image data determined by keywords to specific colors is arranged. With this arrangement, when a color has a specific meaning, color conversion can be executed while maintaining the meaning.

The present invention may be applied to a system constituted by a plurality of devices (e.g., a host computer, an interface device, a reader, a printer, and the like) or an apparatus comprising a single device (e.g., a copying machine, a facsimile apparatus, or the like)

The object of the present invention is realized even by supplying a storage medium storing software program codes for realizing the functions of the above-described embodiments to a system or an apparatus, and causing the computer (or a CPU or an MPU) of the system or the apparatus to read out and execute the program codes stored in the storage medium.

In this case, the program codes read out from the storage medium realize the functions of the above-described embodiments by themselves, and the storage medium storing the program codes constitutes the present invention.

As a storage medium for supplying the program codes, a floppy disk, a hard disk, an optical disk, a magnetooptical disk, a CD-ROM, a CD-R, a magnetic tape, a nonvolatile memory card, a ROM, or the like can be used.

The functions of the above-described embodiments are realized not only when the readout program codes are executed by the computer but also when the OS (Operating System) running on the computer performs part or all of actual processing on the basis of the instructions of the program codes, as a matter of course.

The functions of the above-described embodiments are also realized when the program codes read out from the storage medium are written in the memory of a function expansion board inserted into the computer or a function expansion unit connected to the computer, and the CPU of the function expansion board or function expansion unit performs part or all of actual processing on the basis of the instructions of the program codes, as a matter of course.

Figure 27:
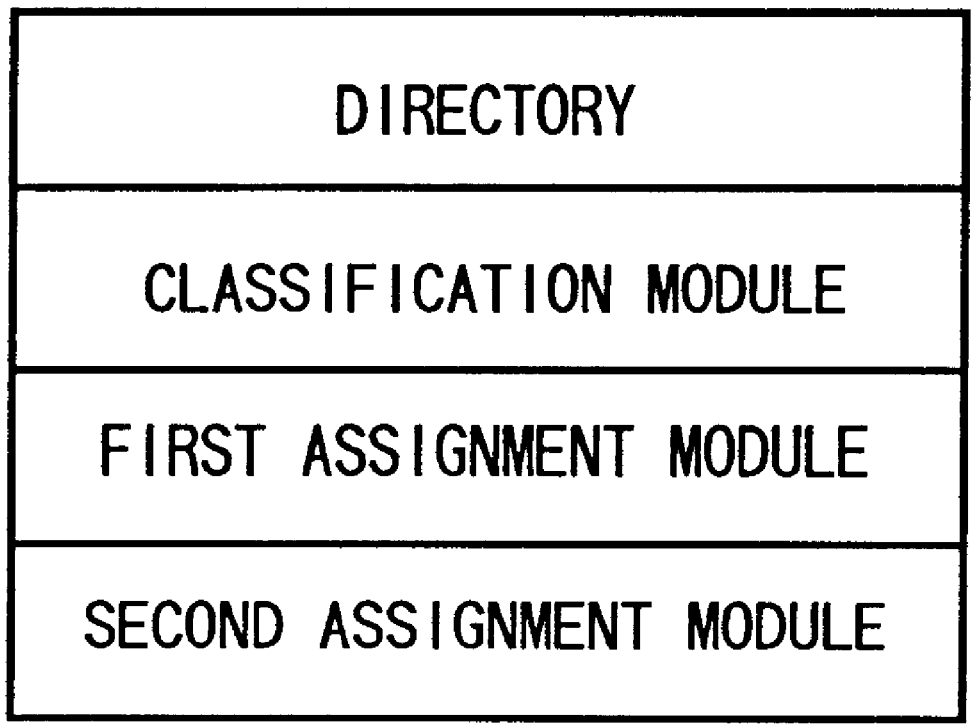
FIG. 27 is a view showing the structure of a storage medium memory map storing program codes for realizing the embodiments of the present invention.

When the present invention is applied to the storage medium, the storage medium stores program codes corresponding to the above-described flow charts. Briefly speaking, modules shown in a memory map in FIG. 27 are stored in the storage medium.

More specifically, the storage medium may store at least program codes of a "classification module", a "first assignment module", and a "second assignment module".

The "classification module" classifies colors used in input image data as achromatic colors or chromatic colors on the basis of their saturations. The "first assignment module" assigns achromatic colors which can be output from the output device to colors classified as achromatic colors on the basis of their lightnesses. The "second assignment module" assigns chromatic colors which can be output from the output device to colors classified into chromatic colors on the basis of their hues.

As many apparently widely different embodiments of the present invention can be made without departing from the spirit and scope thereof, it is to be understood that the invention is not limited to the specific embodiments thereof except as defined in the appended claims.

What is claimed is:

1. An image processing apparatus for assigning colors used in input image data to colors which are outputtable from an output device, wherein the colors include a plurality of achromatic colors having different lightnesses and a plurality of colors having different hues, comprising:

classification means for classifying the colors used in the input image data as achromatic colors or chromatic colors on a basis of saturations of the colors used in the input image data and a number of achromatic colors which are outputtable from the output device;

first assignment means for assigning, on a basis of lightnesses of the colors classified as the achromatic colors by said classification means, achromatic colors which are outputtable from the output device to the colors classified as the achromatic colors; and second assignment means for assigning, on a basis of hues and lightnesses of the colors classified as the chromatic colors by said classification means, chromatic colors which are outputtable from the output device to the colors classified as the chromatic colors, wherein a sum of a number of the first assigned colors by the first assignment means and a number of the second assigned colors by the second assignment means do not exceed a number of the colors which are outputtable from the output device, and wherein the number of colors which are outputtable from the output device is less than the number of colors which are expressible of the input image data.

2. The apparatus according to claim 1, further comprising third assignment means for, when some chromatic colors which can be output from said output device have a plurality of lightnesses and the same hue, assigning the chromatic colors having the plurality of lightnesses to a plurality of colors on the basis of the lightnesses of the plurality of colors which are assigned to the same hue by said second assignment means.

3. The apparatus according to claim 2, further comprising fourth assignment means for, when some chromatic colors which can be output from said output device have the same hue, the same lightness, and a plurality of saturations, assigning the chromatic colors having the plurality of saturations to a plurality of colors on the basis of the saturations of the plurality of colors which are assigned to the same lightness by said third assignment means.

4. The apparatus according to claim 1, wherein said classification means compares a predetermined threshold value with the saturation of each of the colors used in the input image data, thereby classifying the color as an achromatic color when the saturation is less than the predetermined threshold value or as a chromatic color when the saturation is not less than the threshold value.

5. The apparatus according to claim 1, wherein said first assignment means assigns the achromatic colors which can be output from said output device to the colors classified as achromatic colors by said classification means in the order of lightnesses.

6. The apparatus according to claim 1, wherein said second assignment means assigns the chromatic colors which can be output from said output device to the colors classified as chromatic colors by said classification means in the order of hues.

7. The apparatus according to claim 1, wherein said first assignment means compares the lightness of each of the colors classified as achromatic colors by said classification means with a plurality of threshold values to assign the chromatic colors which can be output from said output device to the colors, and when a plurality of colors are overlappingly assigned to a first achromatic color of the chromatic colors which can be output, assigns one of the plurality of overlappingly assigned colors to an achromatic color different from the first achromatic color in the order of lightnesses of the plurality of overlappingly assigned colors.

8. The apparatus according to claim 1, wherein said second assignment means compares the hue of each of the colors classified as chromatic colors by said classification means with a plurality of threshold values to assign the chromatic colors which can be output from said output device to the colors, and when a plurality of colors are overlappingly assigned to a first chromatic color of the chromatic colors which can be output, assigns one of the plurality of overlappingly assigned colors to a chromatic color different from the first chromatic color in the order of hues of the plurality of overlappingly assigned colors.

9. The apparatus according to claim 1, further comprising selection means for, when a plurality of image data are input, selecting a plurality of desired image data from the plurality of image data, so that colors commonly used in the plurality of image data selected by said selection means are assigned to the same color of the colors which can be output from said output device.

10. The apparatus according to claim 1, further comprising setting means for performing setting such that an image data having a predetermined color or an image data which is made to correspond to a keyword is assigned to a specific color or a color group including the specific color, and wherein said classification means classifies the image data having the predetermined color or the image data which is made to correspond to a keyword into the group including the specific color on the basis of setting by said setting means.

11. An image processing method of assigning colors used in input image data to colors which are outputtable from an output device, wherein the colors include a plurality of achromatic colors having different lightnesses and a plurality of colors having different hues, comprising:

a classification step, of classifying the colors used in the input image data as achromatic colors or chromatic colors on a basis of saturations of the colors used in the input image data and a number of achromatic colors which are outputtable from the output device;

a first assignment step, of assigning, on a basis of lightnesses of the colors classified as the achromatic colors in the classification step, achromatic colors which are outputtable from the output device to the colors classified as the achromatic colors; and a second assignment step, of assigning, on a basis of hues and lightnesses of the colors classified as the chromatic colors in the classification step, chromatic colors which are outputtable from the output device to the colors classified as the chromatic colors, wherein a sum of a number of the first assigned colors by the first assignment step and a number of the second assigned colors by the second assignment step do not exceed a number of the colors which are outputtable from the output device, and wherein the number of colors which are outputtable from the output device is less than the number of colors which are expressible of the input image data.

12. The method according to claim 11, further comprising the third assignment step of, when some chromatic colors which can be output from said output device have a plurality of lightnesses and the same hue, assigning the chromatic colors having the plurality of lightnesses to a plurality of colors on the basis of the lightnesses of the plurality of colors which are assigned to the same hue in the second assignment step.

13. The method according to claim 12, further comprising the fourth assignment step of, when some chromatic colors which can be output from said output device have the same hue, the same lightness, and a plurality of saturations, assigning the chromatic colors having the plurality of saturations to a plurality of colors on the basis of the saturations of the plurality of colors which are assigned to the same lightness in the third assignment step.

14. The method according to claim 11, wherein the classification step includes comparing a predetermined threshold value with the saturation of each of the colors used in the input image data, thereby classifying the color as an achromatic color when the saturation is less than the predetermined threshold value or as a chromatic color when the saturation is not less than the threshold value.

15. The method according to claim 11, wherein the first assignment step includes assigning the achromatic colors which can be output from said output device to the colors classified as achromatic colors in the classification step in the order of lightnesses.

16. The method according to claim 11, wherein the second assignment step includes assigning the chromatic colors which can be output from said output device to the colors classified as chromatic colors in the classification step in the order of hues.

17. The method according to claim 11, wherein the first assignment step includes comparing the lightness of each of the colors classified as achromatic colors in the classification step with a plurality of threshold values to assign the chromatic colors which can be output from said output device to the colors, and when a plurality of colors are overlappingly assigned to a first achromatic color of the chromatic colors which can be output, assigns one of the plurality of overlappingly assigned colors to an achromatic color different from the first achromatic color in the order of lightnesses of the plurality of overlappingly assigned colors.

18. The method according to claim 11, wherein the second assignment step includes comparing the hue of each of the colors classified as chromatic colors in the classification step with a plurality of threshold values to assign the chromatic colors which can be output from said output device to the colors, and when a plurality of colors are overlappingly assigned to a first chromatic color of the chromatic colors which can be output, assigns one of the plurality of overlappingly assigned colors to a chromatic color different from the first chromatic color in the order of hues of the plurality of overlappingly assigned colors.

19. The method according to claim 11, further comprising the selection step of, when a plurality of image data are input, selecting a plurality of desired image data from the plurality of image data, so that colors commonly used in the plurality of image data selected in the selection step are assigned to the same color of the colors which can be output from said output device.

20. The method according to claim 11, further comprising the setting step of performing setting such that an image data having a predetermined color or an image data which is made to correspond to a keyword is assigned to a specific color or a color group including the specific color, and wherein the classification step includes classifying the image data having the predetermined color or the image data which is made to correspond to a keyword into the group including the specific color on the basis of setting in the setting step.

21. A computer-readable memory which stores program codes of image processing for assigning colors used in input image data to colors which are outputtable from an output device, wherein the colors includes a plurality of achromatic colors having different lightnesses and a plurality of colors having different hues, said program codes comprising:

a program code of a classification step, of classifying colors used in input image data as achromatic colors or chromatic colors on a basis of saturations of the colors used in the input image data and a number of achromatic colors which are outputtable from the output device;

a program code of a first assignment step, of assigning, on a basis of lightnesses of the colors classified as the achromatic colors in the classification step, achromatic colors which are outputtable from an output device to the colors classified as the achromatic colors; and a program code of a second assignment step, of assigning, on a basis of hues and lightnesses of the colors classified as the chromatic colors in the classification step, chromatic colors which are outputtable from the output device to the colors classified as the chromatic colors, wherein a sum of a number of the first assigned colors by the first assignment step and a number of the second assigned colors by the second assignment step do not exceed a number of the colors which are outputtable from the output device, and wherein the number of colors which are outputtable from the output device is less than the number of colors which are expressible of the input image data.

* * * * *